US012132253B2

(12) United States Patent
Green et al.

(10) Patent No.: US 12,132,253 B2
(45) Date of Patent: Oct. 29, 2024

(54) NEAR-GRAZING RETROREFLECTORS FOR POLARIZATION

(71) Applicant: Hitachi Rail GTS Canada Inc., Toronto (CA)

(72) Inventors: Alon Ion Green, Toronto (CA); Peter Timmermans, Toronto (CA); Walter Kinio, Toronto (CA); Alex M. H. Wong, Hong Kong (CN); Philip Christian, Toronto (CA); George V. Eleftheriades, Toronto (CA)

(73) Assignee: Hitachi Rail GTS Canada Inc., Toronto (CA)

(*) Notice: Subject to any disclaimer, the term of this patent is extended or adjusted under 35 U.S.C. 154(b) by 0 days.

(21) Appl. No.: 17/505,378

(22) Filed: Oct. 19, 2021

(65) Prior Publication Data

US 2022/0037796 A1 Feb. 3, 2022

Related U.S. Application Data

(62) Division of application No. 16/171,955, filed on Oct. 26, 2018, now Pat. No. 11,183,769.
(Continued)

(51) Int. Cl.
*G02B 5/18* (2006.01)
*H01Q 3/46* (2006.01)
(Continued)

(52) U.S. Cl.
CPC ............... *H01Q 15/18* (2013.01); *H01Q 3/46* (2013.01); *H01Q 15/141* (2013.01);
(Continued)

(58) Field of Classification Search
CPC ........ H01Q 15/18; H01Q 3/46; H01Q 15/141; H01Q 15/24; H01Q 19/10; H01Q 21/062;
(Continued)

(56) References Cited

U.S. PATENT DOCUMENTS 3,681,771 A 8/1972 Lewis et al.
4,123,140 A 10/1978 Ryan et al.
(Continued)

FOREIGN PATENT DOCUMENTS

EP 2624364 A1 8/2013
EP 3223369 A1 9/2017
(Continued)

OTHER PUBLICATIONS

Kim et al. (Optical Huygens' metasurfaces with independent control of the magnitude and phase of the local reflection coefficients, Physical Review X 4, p. 041042-1-11, 2014). (Year: 2014).*
(Continued)

*Primary Examiner* — Arnel C Lavarias
(74) *Attorney, Agent, or Firm* — Studebaker & Brackett PC

(57) ABSTRACT

A metasurface includes a dielectric material, a ground plane on a back side of the dielectric material; and at least one conductive element on a top surface of the dielectric material, wherein the at least one conductive element includes at least one of a ground-backed dipole or a slot array.

18 Claims, 17 Drawing Sheets

Related U.S. Application Data

(60) Provisional application No. 62/578,026, filed on Oct. 27, 2017.

(51) Int. Cl.
*H01Q 15/14* (2006.01)
*H01Q 15/18* (2006.01)
*H01Q 15/24* (2006.01)
*H01Q 19/10* (2006.01)
*H01Q 21/06* (2006.01)

(52) U.S. Cl.
CPC ............. *H01Q 15/24* (2013.01); *H01Q 19/10* (2013.01); *H01Q 21/062* (2013.01)

(58) Field of Classification Search
CPC ...... H01Q 9/16; H01Q 13/10; H01Q 15/0053; H01Q 3/2647; G02B 1/002; G02B 5/008; G02B 2207/101; G02B 1/00; G02B 5/12; G02B 27/0012; G02B 5/30; G02B 27/28
USPC .... 359/566, 483.01, 485.01, 486.01, 493.01, 359/529, 530, 896; 343/720, 721, 725, 343/767, 770, 793, 893
See application file for complete search history.

(56) References Cited

U.S. PATENT DOCUMENTS

| | | | | |
|---|---|---|---|---|
| 4,684,952 | A | 8/1987 | Munson et al. | |
| 5,714,223 | A | 2/1998 | Araki et al. | |
| 5,975,706 | A | 11/1999 | Nakayama | |
| 6,770,225 | B2 | 8/2004 | Nilsen et al. | |
| 11,183,769 | B2 * | 11/2021 | Green | H01Q 15/18 |
| 2015/0229029 | A1 * | 8/2015 | Maruyama | H01Q 15/14 343/912 |
| 2016/0352021 | A1 * | 12/2016 | Kim | H01Q 1/38 |
| 2017/0235162 | A1 | 8/2017 | Shaltout et al. | |
| 2018/0039183 | A1 | 2/2018 | Ye et al. | |
| 2018/0045953 | A1 | 2/2018 | Fan et al. | |

FOREIGN PATENT DOCUMENTS

| | | |
|---|---|---|
| JP | 2003242815 | 8/2003 |
| WO | 2014/035111 | 3/2014 |

OTHER PUBLICATIONS

Wong et al., "Perfect Anomalous Reflection with a Binary Huygens' Metasurface," Sep. 18, 2017, pp. 1-12, The Edward S. Rogers Department of Electrical and Computer Engineering, University of Toronto, Toronto, Canada.

Extended European Search Report issued in corresponding European Patent Application No. 18869898.9, mailed Nov. 10, 2020, pp. 1-10, European Patent Office, Munich, Germany.

Ahsan, Md Rezwanul et al., "Metasurface Reflector (MSR) Loading for High Performance Small Microstrip Antenna Design", PLOS ONE, DOI: 10.1371/journal.pone0127185, May 27, 2015, pp. 1-20.

Arbabi, Amir et al., "Planar Metasurface Retroreflector", Nature Photonics, www.nature.com/naturephotonics, 2017, pp. 1-9.

Arbabi, Amir et al., "Dielectric Metasurfaces for Complete Control of Phase and Polarization with Subwavelength Spatial Resolution and High Transmission", Nov. 1, 2015, www.emfpecora.eu/download/stanford_university/Journal%20club%2009252015.pdf, 17 pages.

Chaimool, Sarawuth, et al., "Mu-near-zero metasurface for microstrip-fed slot antennas", SpringerLink, Applied Physics A, Sep. 2013, vol. 112, Issue 3, pp. 669-675.

Estakhri, Nasim Mohammadi, et al., "Visible Light, Wide-Angle Graded Metasurface for Back Reflection", ACS, Photonics, Jan. 23, 2017, 4 (2), https://pubs.acs.org/do/abs10.1021/acsphotonics.6900965?src=recsys&journalCode_apchd5.

Kamali, Seyedeh Mahsa, et al., "Angle-Multiplexed Metasurfaces: Encoding Independent Wavefronts in a Single Metasurface under Different Illumination Angles", Physical Review X 7, 041056 (2017), pp. 1-9.

Kwon, Hoyeong, et al., "Broadband Absorption with Gradient Metasurfaces", EPJ Appl. Metamat. 2018, 5, 4; EDP Sciences 2018, pp. 1-7.

Neder, Verena, "Wide-Angle, Broadband Graded Metasurface for Back Reflection", University of Amsterdam, MSc Physics, Science for Energy and Sustainability, Master Thesis, Jun. 2016, pp. 1-49.

Ra'di, Younes, et al, "Meta-Gratings: Beyond the Limited of Graded Metasurfaces for Wavefront Control", Department of Electrical and Computer Engineering, The University of Texas at Austin, Jan. 1, 2017, pp. 1-16.

Shang, Yuping et al., "Polarization-Independent Backscattering Enhancement of Cylinders Based on Conformal Gradient Metasurfaces", IEEE Transactions on Antennas and Propagation, vol. 65, No. 5, May 2017, pp. 2386-2396.

Wang, Zheng-bin, et al., "High-Efficiency Electromagnetic Wave Controlling with All-Dielectric Huygens' Metasurfaces", Hindawi Publishing Corporation, International Journal of Antennas and Propagation, vol. 2015, Articles ID 432095, 7 pages.

Wong, Alex M. H., et al., "Binary Huygens' Metasurface: A Simple and Efficient Retroreflector at Near_Grazing Angles", Mar. 1, 2017, https://ieeexplore.ieee.org/stamp.stamp.jsp?tp=&arnumber=7878269, 2 pages.

Wong, Alex M. H., et al., "Perfect Anomalous Reflection with an Aggressively Discretized Huygens' Metasurface", January 1, 20171, https://arxiv.org/ftp/arxiv/papers/1706/1706.02765.pdf; 3 pages.

Wong, Alex, M. H., et al., "Binary Huygens' Metasurfaces: Experimental Demonstration of Simple and Efficient Near-Grazing Retroreflectors for TE and TM Polarizations", IEEE Transactions on Antennas and Propagation, 2018, pp. 1-11.

Sun et al. (High-efficiency broadband anomalous reflection by gradient meta-surfaces, Nano Lett. 2012, 12, pp. 6223-6229) (Year: 2012).

Van Acoleyen et al. (Optical retroreflective marker fabricated on silicon-on-insulator, IEEE Photonics Journal vol. 3, No. 5, Oct. 2011, pp. 789-798) (Year: 2011).

* cited by examiner

NEAR-GRAZING RETROREFLECTORS FOR POLARIZATION

PRIORITY

This application is a divisional of and claims the benefit of priority from U.S. patent application Ser. No. 16/171,955, filed Oct. 26, 2018, and the benefit of priority from U.S. Prov. Pat. Appl. No. 62/578,026, filed Oct. 27, 2017, the contents of which, in their entirety, are incorporated herein by reference.

BACKGROUND

A retroreflector is a device which reflects an electromagnetic wave in the direction of incidence. Passive retroreflection of electromagnetic waves, from radio to optical frequencies, has practical applications in communication with satellites and unmanned aerial vehicles, remote sensing, target labeling, navigation safety and radiation cross section (RCS)/visibility enhancement. In communication and other applications, characteristics of desirable retroreflectors include the ability to (i) operate at large angles of oblique incidence, (ii) retroreflect transverse electric (TE)- and transverse magnetic (TM)-polarized electromagnetic (EM) radiation. Further desirable characteristics of retroreflectors include (iii) low retroreflector profiles, (iv) light weight, (v) low loss, (vi) low cost and (vii) manufacturability.

The simplest retroreflection structure is a metallic plate, which retroreflects with high efficiency at near-normal incidence, or small incident angles, and (much) lower efficiency at large incident angles. Other metallic structures—such as a cylinder or a sphere—also exhibit retroreflection. As expected, other metallic structures feature weaker retroreflection strengths, but the retroreflection levels remain the same as the incident waves' direction varies in the azimuthal plane for the cylinder, and across all angles for the sphere.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
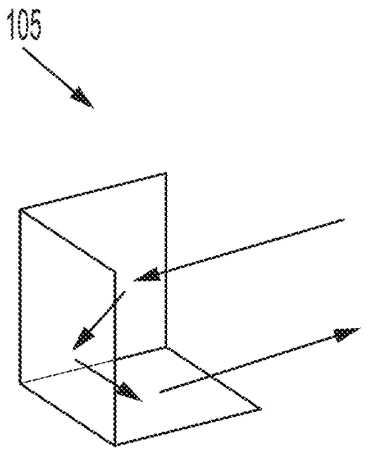
FIGS. 1A-I are diagrams of retroreflectors, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1A is a diagram of a corner cube 105, according to some embodiments. A corner cube is a highly efficient metallic retroreflection structure. By connecting two (or three) metallic plates at right angles, one forms a reflection structure where the incoming wave is reflected two (or three) times and achieves retroreflection. Theoretical and experimental works show that the corner cube provides efficient retroreflection with incident angles in the range of ±15°, where a "normal" incidence angle is 0°. Corner cubes are large structures, with a depth that is appreciable compared to the size of the aperture, and do not support retroreflection beyond a maximum angle of 45°. Some corner cubes alter the polarization of the incident EM wave. Corner cube dimensions are reduced by building a sheet of corner cubes using a 2-dimensional (2D) array of small trihedral corner cubes, while having appreciable retroreflection with incident angles in the range of ±30°. Even low-dimension corner cubes are not efficient at high-incident angle (e.g., large oblique angle) EM waves.

Another class of retroreflectors involves dielectric and/or plasmonic materials. For a random array of spherical (or near-spherical) scatterers, coherent back scattering occurs to strengthen retroreflection. Under favorable conditions, a retroreflection strength as high as 40% has been observed. A similar effect occurs for random rough surfaces. Surfaces with random arrays of spherical or near spherical reflectors, or randomly rough surfaces, encourage multiple scattering, and thereby strengthen the retroreflected wave component which achieves phase-alignment across multiple paths.

Figure 1B:
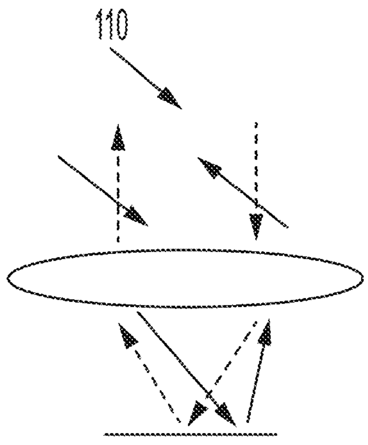

FIG. 1B is a diagram of a cat's-eye retroreflector 110, according to some embodiments. A cat's eye retroreflector is a convex dielectric lens placed one focal length away from a (ideally parabolic) mirror. Cat's-eye retroreflectors have a depth that is comparable to the lateral size of the retroreflector. Because the incident EM wave is focused on a considerably smaller area at the location of the mirror, a cat's-eye retroreflector is useful for performing switching and encoding on an electromagnetic signal. Some embodiments of a cat's-eye retroreflector with a multistage lens have achieved highly-efficient retroreflection across ±15° of incident angle range. Some embodiments of a cat's-eye retroreflector have an array of micro-lenses and micromirrors and, while having a low profile, achieve efficient retroreflection across an incident angular range of ±30°.

Figure 1C:
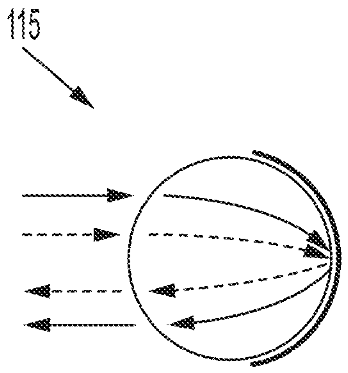

FIG. 1C is a diagram of a Luneberg lens retroreflector 115, according to some embodiments. A Luneberg lens retroreflector replaces a convex lens of the cat's-eye retroreflector with a lens-mirror spacing of a Luneburg lens, one arrives at the Luneburg lens retroreflector. Some embodiments of Luneberg lens retroreflectors have efficient retroreflection across an incident angular range of about ±50°. A Luneburg lens retroreflector is limited by its large size, heavy weight and relatively expensive fabrication. More exotic metallodielectric retroreflectors have been proposed.

Figure 1D:
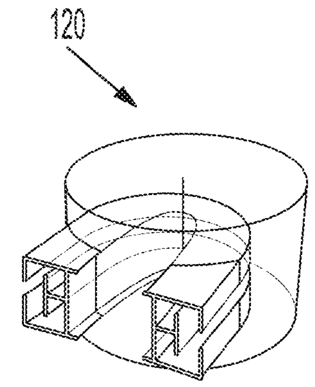

FIG. 1D is a diagram of an Eaton lens 120, according to some embodiments. Eaton lens 120 performs retroreflection by trapping EM waves within the structure of the reflector and uses a high degree of internal reflection to redirect the EM waves through the lens from an input end to an output end, and from thence toward a target in line with the output end of the lens. Further examples of metallodielectric retroreflectors include retro-reflection super-scatterer implemented through the transformation optics approach, and a plasmonic superscatterer, a superdirective small antenna, impedance matched by metal and dielectric shells of precise thickness. Such retroreflectors involve high precision manufacturing and materials controls.

Figure 1E:
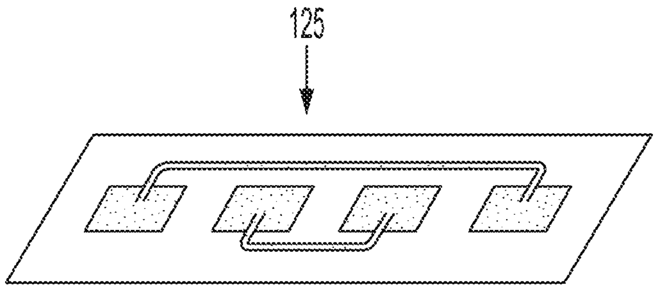

FIG. 1E is a diagram of a Van Atta array retroreflector 125, according to some embodiments. The Van Atta array is a practical and low profile wide angle retroreflector for RF electromagnetic waves, with a surface designed to efficiently couple to the incident and reflected waves, where crossed transmission-line connections between antenna areas reverse the phase front on the surface of the retroreflector. Thus together, the Van Atta array antennas and their connections reverse the phase front along the surface of the retroreflector to achieve retroreflection. Van Atta arrays work in 1D and 2D configurations, and on both planar and curved surfaces, and for a wide incident angular range of over ±60°. However, the Van Atta array relies on the near-resonant operation of antenna elements. Hence the operation bandwidth of a Van Atta array is limited by the antenna elements, and the incident angular range of retroreflected EM waves is regulated by the element factor. The element factor is the electric field pattern produced by a single cell (element) which defines the angular base band and angular bandwidth for the reflective response. In the example above, for the Van Atta array, the angular base band ranges from about −60° to about +60°, and has a narrow angular bandwidth of about ±5° at 0° or ±1° at +60° or −60°. Similarly, extension of Van Atta array retroreflection beyond the mm-wave regime is difficult because of limitations of the antenna elements and the transmission lines between antenna elements. Additionally, the complexity of routing between antennas rapidly increases with increasing antenna array size. This makes the Van Atta array impractical for a retroreflector with an aperture length of several wavelengths and beyond.

Figure 1F:
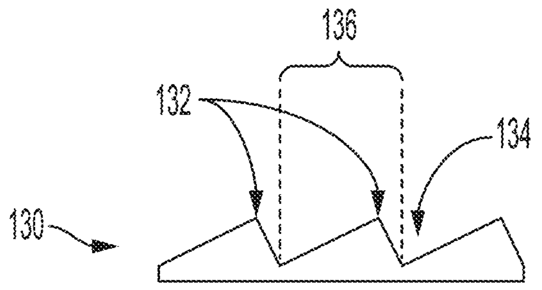
Figure 1G:
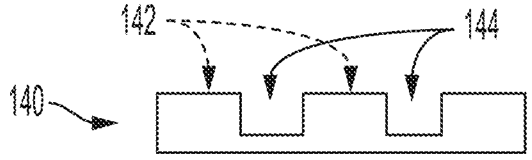
Figure 1H:
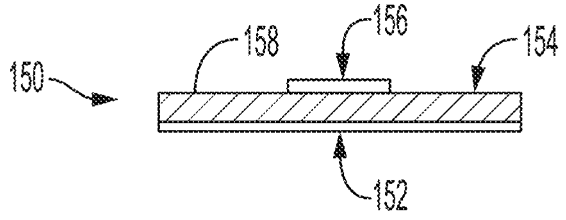

FIGS. 1F-1H are examples of gratings that are configured to interact with incident EM waves. FIG. 1F is an echellete grating 130, according to some embodiments of the present disclosure. Echellete grating 130 has peaks 132 and troughs 134, with a period 136 between adjacent peaks 132 and/or adjacent troughs 134 of the echellete grating 130. FIG. 1G is a groove grating 140, according to some embodiments of the present disclosure. Groove grating 140 includes peaks 142 and troughs 144 configured to interact with incoming electromagnetic (EM) radiation (EM waves) and to manipulate the reflection of an incident EM wave according to the pattern and dimensions of the groove peaks and troughs. FIG. 1H is a strip grating 150 according to some embodiments of the present disclosure. Strip grating 150 includes a backing metallic layer 152, on which a dielectric layer 154 rests, with metallic islands 156 on the top surface of the dielectric layer (the side opposite the backing metallic layer 152). The pattern of metallic islands 156 on the top surface 158 of the dielectric 154 regulates the reflection characteristics of incident EM wave.

Figure 1I:
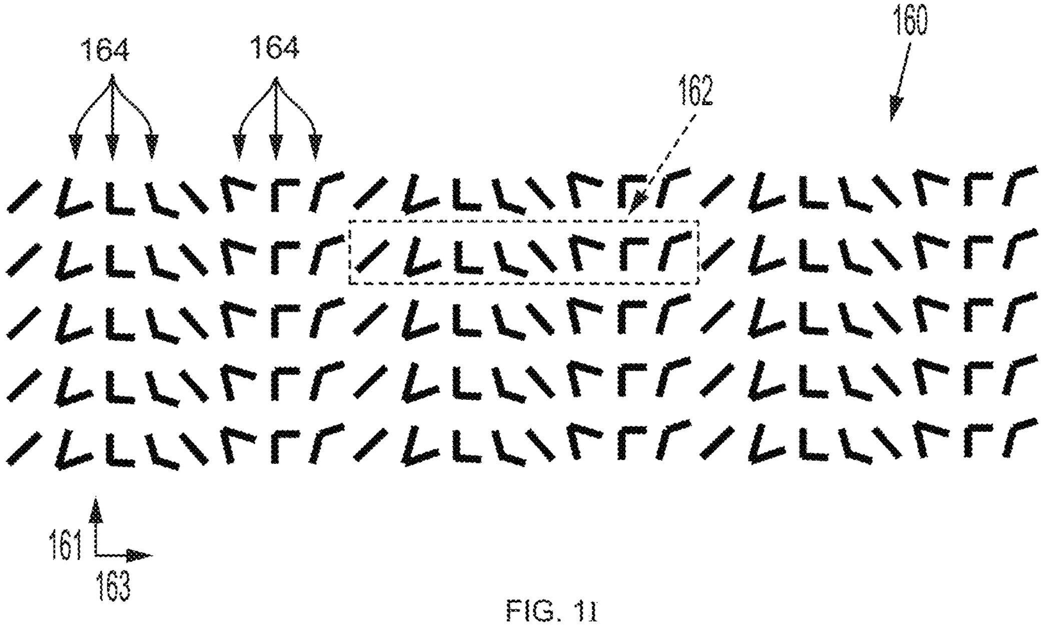

FIG. 1I is a top-view of a metasurface 160 configured to reflect incident EM waves from the metasurface 160. Metasurface 160 includes a periodic array 162 of surface structures 164 configured to interact with incident EM waves and to manipulate the EM waves upon reflection from the metasurface 160. In metasurface 160, each periodic array 162 includes a set of non-repeating surface structures. In some embodiments of metasurfaces, the periodic array includes some repeated surface structures, separated across the metasurface. In some embodiments of metasurfaces, the periodic array includes line structures that extend upward from a base layer of the metasurface. In some embodiments, of metasurfaces, the periodic array includes holes (slots, lines, grooves, and so forth) that extend into the metasurface base layer. In some embodiments, the metasurface includes a combination of line structures that extend upward from a base layer of the metasurface, and a set of holes that extend into the metasurface base layer. In some embodiments, the metasurface is a single material. In some embodiments, the metasurface is a stack of materials, with features of one material covered in (or extending into) another material. In some embodiments, the period array 162 is longer in a first direction 163 on the metasurface than in a second direction 161 of the metasurface.

Metasurfaces such as metasurface 160 are versatile tools in EM wave manipulation. By tuning the surface impedance as a function of position across the metasurface, metasurfaces perform wave operations which modify the amplitude, phase, polarization and propagation direction of an incident wave are performed in a passive manner. Passive wave operations are performed as an incident EM wave strikes and reflects from a metasurface, without any active EM wave generation to interact with the incident or reflected wave. Metasurfaces with linear phase variants represent low profile and cost-effective structures. The angle of reflection from a metasurface is regulated according to the structure of (or structural elements in) the metasurface. Metasurfaces, being inherently two-dimensional, provide more freedom in waveform manipulation than gratings, which are inherently one-dimensional. Until the present disclosure, metasurfaces have featured finely discretized surface impedance profiles implemented by element cells of size $\lambda/8$ (e.g., one eighth of a wavelength) or smaller. For such finely discretized surface impedance profiles to interact with EM waves having higher frequencies involves high-precision fabrication. Metasurfaces with highly-precise structural elements are generally more expensive to manufacture, less robust after manufacture, and/or difficult or impossible to scale to shorter wavelengths. As of this disclosure, there is little information about near-grazing (i.e., large incident angle) metasurface operation, including little or no information about power efficiency of near-grazing metasurface operations.

The present disclosure describes the design and manufacture of embodiments of metasurfaces with near-grazing angle retroreflection for both TE and TM polarized EM waves. A TE polarized EM wave has the electric field vector perpendicular to the plane of incidence, and a TM polarized EM wave has the magnetic field vector perpendicular to the plane of incidence. In some embodiments, metasurfaces with near-grazing retroreflection include a subwavelength array of rods (for TE waves) and/or slots (for TM waves) backed by a ground plane. In some embodiments of metasurfaces described herein, the metasurface includes a grating with a (n ultra-coarse) discretization of two cells per grating period. Embodiments of metasurfaces with two cells per grating period alleviate, to a large degree, the need for small features. Such metasurfaces also present opportunities to design and manufacture metasurfaces with highly reflection efficiency, robust surfaces, cost effectiveness, and ease of scaling to mm-wavelengths and THz frequencies. The remainder of the present disclosure presents a metasurface design methodology and describes embodiments of metasurfaces and full-wave simulation results for TE and TM retroreflection metasurfaces. For embodiments of TM-reflective metasurfaces, the present disclosure examines origins of spurious reflections not observed for embodiments of TE-reflective metasurfaces. The present disclosure also includes methods and results of monostatic and bi-static radiation cross section (RCS) experiments that validate the metasurface design methodology presented herein. Diagrams of RCS measurements have nodes that correspond to the intensity of an EM wave that is reflected from the metasurface. Some nodes correspond to specular reflection, some nodes correspond to retroreflection, and some nodes correspond to spurious reflection in a direction other than the incident angle $\theta_i$ or the reflected angle $\theta_r$, or a negative of the reflection angle $-\theta_r$.

The present disclosure discusses the reflective properties of embodiments of a periodic metasurface with aggressively discretization for reflecting both TE and TM waves. In some embodiments, the reflective metasurfaces includes two cells per grating period to perform the EM wave reflection. In some embodiments, the reflection of TE and TM waves is retroreflection of an incident EM wave. In some embodiments, the reflection is at an angle that corresponds to neither a retroreflection angle nor to a specular reflection angle. Simplification of a retroreflective metasurface by using larger feature sizes and more aggressive discretization allows for easier, lower cost design and fabrication of a metasurface. Simulation and measurement of a binary Huygens' metasurface, discretized to have two elements per unit cell, is described below. In some embodiments, a metasurface has a number of cell elements that is greater than two elements per unit cell, according to an incident EM wave desired to be reflected from the metasurface. According to some embodiments, the upper limit of the number of elements in a unit cell is regulated by the size or area of a desired reflective metasurface and the configuration of EM wave reflection intended form the reflective metasurface. Dimensions of a reflective element of a metasurface unit cell are governed by the wavelength of the incident EM wave. A number of reflective elements in a metasurface unit cell is not so large that the reflective elements no longer serve to reflect the incident EM wave. In an embodiment of a metasurface, the simulated and measured metasurface retroreflects an incident plane wave at 82.87°. In some embodiments, the simulated results for a 2D infinite structure have a reflection power efficiency of 94% for TE polarization, and 99% for TM polarization. In some embodiments, measured retroreflection has a reflection power efficiency of 93% for both TE and TM polarizations. In some embodiments, the metasurface is configured to reflect an incident plane wave, having an incident angle $\theta_i$ at a predetermined reflection angle $\theta_r$, where $\theta_i=-\theta_r$ (e.g., retroflection). According to some embodiments, the incident angle ranges as: $90°>\theta_i\geq 0°$. In some embodiments, a metasurface is configured to reflect an incident plane wave at a predetermined reflection angle $\theta_r$, where $\theta_r\neq\theta_i$ and $\theta_r\neq\theta_i$ (e.g., neither retroreflection nor specular reflection). A range of reflection angles for a reflected EM wave, from an incident EM wave with an incident angle $\theta_i$, as given above, ranges as $89.5°>\theta_r\geq 0°$. Some embodiments of controlled-reflection metasurfaces are configured to retroreflect incident one or more incident EM waves at one or more arbitrary reflection angles. In some embodiments, the reflection of an EM wave is adjusted to reflect either TE or TM waves. In some embodiments, the reflection of an EM wave is adjusted to reflect both TE and TM waves.

Metasurface Design Methodology

Metasurface design as presented herein is performed using a surface impedance approach. To design a reflective metasurface, one first begins by determining the surface impedance (and reflection coefficient) profile of the reflective metasurface, followed by examining the effects of discretization on the performance of the metasurface.

A. Surface Impedance Analysis

Figure 2A:
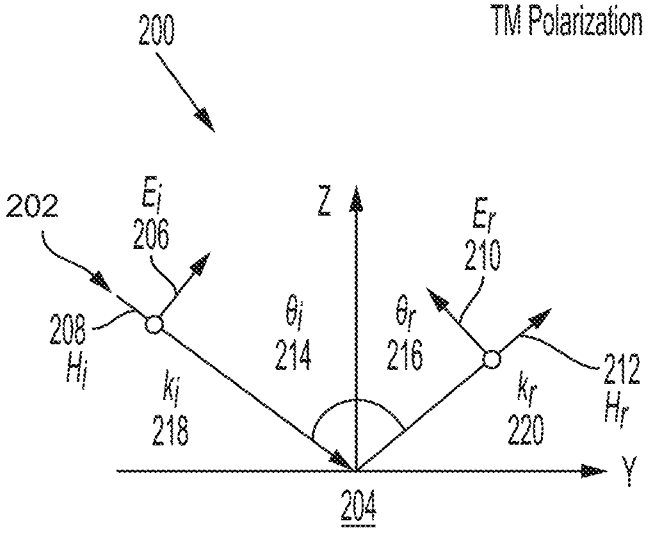
FIGS. 2A-B are diagrams of single-plane-wave reflections off a metasurface in accordance with some embodiments.

FIG. 2A is a diagram 200 of a single plane TM wave 202 reflection in the yz plane, off a metasurface 204 at z=0. TM wave 202 has an incident electrical component $E_i$ 206 that is parallel to the metasurface, and the incident magnetic component H 208 that is perpendicular to the metasurface. Similarly, TM plane wave 202 has the reflected electrical component 210 $E_i$ is parallel to the metasurface and the reflected magnetic component 212 H is perpendicular to the metasurface. Incident angle $\theta_i$ 214 of TM wave 202 is the same as reflection angle $\theta_r$ 216, indicative of specular reflection of the incident EM wave from metasurface 204. Incident angle $\theta_i$ 214 and reflected angle $\theta_r$ 216 are both positive angles, measured from the z-axis in the yz-plane. $k_i$ 218 is the incident wave number (vector), and $k_r$ 220 is the reflected wave number (vector).

Figure 2B:
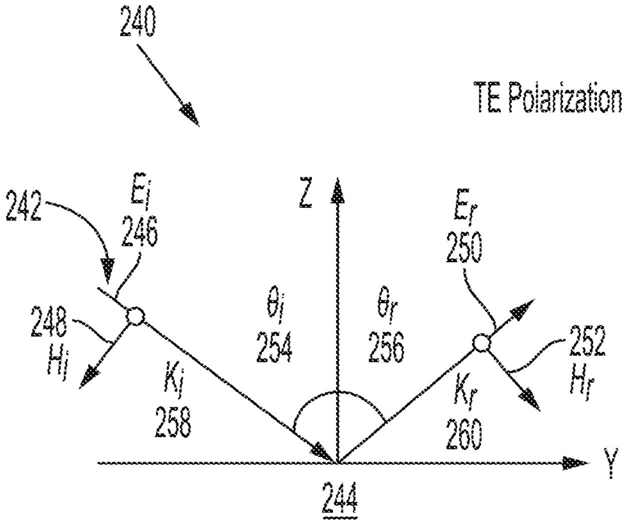

FIG. 2B is a diagram 240 of a single plane TE wave 242 reflection in the yz plane, off a metasurface 244 at z=0. TE wave 242 has an incident electrical component $E_i$ 246 that is perpendicular to the metasurface and an incident magnetic component H 248 that is parallel to the metasurface. Similarly, TE plane wave 202 has a reflected electrical component 250 $E_i$ that is perpendicular to the metasurface and a reflected magnetic component 252 $H_i$ that is parallel to the metasurface. Incident angle $\theta_i$ 254 of TE wave 242 is the same as reflection angle $\theta_r$ 256, indicative of specular reflection of the incident EM wave from metasurface 244. Incident angle $\theta_i$ 254 and reflected angle $\theta_i$ 256 are both positive angles, measured from the z-axis in the yz-plane. $k_i$ 258 is the incident EM wave number (vector) and $k_r$ 260 is the reflected wave number (vector).

In some embodiments, the incident angle of the EM wave is the same as the reflected angle of the reflected EM wave, and the reflection is called specular reflection. When an EM wave retroreflects back along the incident direction to an EM source, the reflected angle $\theta_r$ is negative because the reflected angle is measured in an opposite rotational direction from the z-axis [$\theta_r$=$-\theta_i$] in the yz-plane. Thus, for "pure" retroreflection, directly back to an EM wave source, the reflection angle is a negative of the incidence angle of the EM wave. Plain metal surfaces exhibit specular reflection. Some embodiments of metasurfaces described herein exhibit both specular reflection, and retroreflection (e.g., major nodes of reflected signal are present in a RCS measurement of a metasurface, as with FIGS. 10A-C, below). The reflective characteristics of the metasurface are related to the geometry and physical composition of the metasurface, which determine the angle at which an incident EM wave, or incident radiation, reflects from the metasurface. Some metasurfaces described herein are configured to reflect at a single incident angle (or, a window of angles around a main incident angle). Some metasurfaces described herein are configured to reflect at multiple main incident angles, according to layouts and compositions of the elements in unit cells of the metasurface. In some instances, metasurfaces described herein are configured to reflect EM waves approaching a metasurface at multiple incident angles, away from the metasurface at a single reflection angle, according to some embodiments.

Equations (1)-(14) describe the method of analyzing surface impedance using TM incident polarization, to make metasurfaces with controlled reflection and/or retroreflection. In FIG. 2A, electric ($E_i$) and magnetic ($H_i$) portions of an incident plane wave are described by equations 1 and 2, and the electric ($E_r$) and magnetic ($H_r$) portions of a reflected plane wave are described by equations 3 and 4, below:

$$E_i = E_{i0}\exp(-jk_0(\sin\theta_i\ y - \cos\theta_i\ z))\cdot(\cos\theta_i\ \hat{y} + \sin\theta_i\ \hat{z}),\quad \text{Equation (1)}$$

$$H_i = \frac{E_{i0}}{\eta}\exp(-jk_0(\sin\theta_i y - \cos\theta_i z))\hat{x},\quad \text{Equation (2)}$$

$$E_r = E_{r0}\exp(-jk_0(\sin\theta_r\ y - \cos\theta_r\ z))\cdot(\cos\theta_r\ \hat{y} + \sin\theta_r\ \hat{z}),\quad \text{Equation (3)}$$

and $$H_r = \frac{E_{r0}}{\eta}\exp(-jk_0(\sin\theta_r y - \cos\theta_r z))\hat{x},\quad \text{Equation (4)}$$

where:

$\theta_i$=is the angle of incidence of the incident EM waveform,
$\theta_r$=is the angle of reflection of the EM waveform,
$E_{i0}$=is the incident electric field,
$E_{r0}$=is the reflected electric field,
y=is the y component in the x-y-z coordinate system,
z=is the z component in the x-y-z coordinate system,
j=is an imaginary number,
$\eta$=is the total energy density used in the conversion from the magnetic field to electric field in free space,
$k_0$=is the incident wave number (vector),
$\hat{x}$=is unit vector component in the x direction,
$\hat{y}$=is unit vector component in the y direction, and
$\hat{z}$=is unit vector component in the z direction Here $k_0$=2p=$\lambda_0$ is the spatial frequency the wave and $I_0$ is the free-space wavelength. f is a constant phase offset between the incident and reflected waves at y=0, which remains arbitrary for the moment. The incident and reflected electric ($E_{i,tan}$, $E_{r,tan}$) and magnetic ($H_{i,tan}$, $H_{r,tan}$) fields tangential to the surface (at z=0+) are hence described as follows:

$$E_{i,tan} = E_{i0}\cos\theta_i\exp(-jk_0\sin\theta_i\ y)\hat{y}\quad \text{Equation (5)}$$

$$H_{i,tan} = \frac{E_{i0}}{\eta}\exp(-jk_0\sin\theta_i\ y)\hat{x},\quad \text{Equation (6)}$$

$$E_{r,tan} = E_{r0}\cos\theta_r\exp(-jk_0\sin\theta_r\ y+\phi)\hat{y},\quad \text{Equation (7)}$$

and $$H_{r,tan} = \frac{E_{i0}}{\eta}\exp(-jk_0\sin\theta_r\ y+\phi)\hat{x}.\quad \text{Equation (8)}$$

The two relationships introduced hereinafter simplify the derivation that follows. In equation (9), below:

$$\Delta\phi(y)=k_0(\sin\theta_r-\sin\theta_i)y+\phi\quad \text{Equation (9)}$$

$\Delta$ is defined as the phase difference between the incident and reflected plane waves. Equation (10), below, $$E_{r0} = \sqrt{\frac{\cos\theta_i}{\cos\theta_r}}E_{i0}\quad \text{Equation (10)}$$

relates the incident and reflected plane wave amplitudes for reflection metasurfaces. Equations (9) and (10) are used to calculate the surface impedance as a function of a location on the metasurface. The surface impedance of a metasurface is used to generate a desired reflection based upon the prescribed incidence of an EM wave, as given below in Equation (11):

$$Z_{s,TM} = \frac{E_{tan}\cdot\hat{y}}{H_{tan}\cdot\hat{x}} = \frac{(E_{i,tan}+E_{r,tan})\cdot\hat{y}}{(H_{i,tan}+H_{r,tan})\cdot\hat{x}}\quad \text{Equation (11}$$

-continued $$= \eta \frac{\cos\theta_i\sqrt{\cos\theta_r} - \cos\theta_r\sqrt{\cos\theta_i}\exp(-j\Delta\Phi(y))}{\sqrt{\cos\theta_r} + \sqrt{\cos\theta_i}\exp(-j\Delta\Phi(y))}.$$

For the case of retroreflection, $\theta_r=-\theta_i \Rightarrow \cos\theta_r=\cos\theta_i$. Redefining $\theta=|\theta_i|=|\theta_r|$, Equation (11) becomes:

$$Z_{s,TM} = \eta\cos\theta\left(\frac{1-e^{-j\Delta\Phi(y)}}{1+e^{-j\Delta\Phi(y)}}\right) = jZ_{0,TM}\tan\left(\frac{\Delta\Phi(y)}{2}\right), \quad \text{Equation (12)}$$

where $Z_{0,TM}=\eta\cos\theta$ is the wave impedance for the incident and reflected waves in TM polarization.

In some embodiments, a description of reflection coefficients is preferable to a description of surface impedances. In an embodiment of single plane wave retroreflection, the reflection coefficient is described by Equation (13), below:

$$\Gamma_{TM} = \frac{Z_{s,TM}-Z_{0,TM}}{Z_{s,TM}+Z_{0,TM}} = -e^{-j\Delta\Phi(y)}. \quad \text{Equation (13)}$$

A corresponding relationship for the TE polarization is found by following a procedure similar to the procedure of Equations (1)-(13). For the TE-polarized single wave reflection scenario described by FIG. 2B, the surface impedance is given in Equation (14):

$$Z_{s,TE} = \frac{\eta}{\sqrt{\cos\theta_i\cos\theta_r}}\frac{\sqrt{\cos\theta_r}+\sqrt{\cos\theta_i}\,e^{-j\Delta\Phi(y)}}{\sqrt{\cos\theta_i}-\sqrt{\cos\theta_r}\,e^{-j\Delta\Phi(y)}}. \quad \text{Equation (14)}$$

Equation (14) reduces to Equation (15) when describing retroreflection:

$$Z_{s,TE} = -jZ_{0,TE}\cot\left(\frac{\Delta\Phi(y)}{2}\right), \quad \text{Equation (15)}$$

where $Z_{0,TE}=\eta/\cos\theta$ is the wave impedance for TE-polarized incident and reflected waves. The reflection coefficient which corresponds to the surface impedance of equation (13), above, is given in Equation (16):

$$\Gamma_{TE} = \frac{Z_{s,TE}-Z_{0,TE}}{Z_{s,TE}+Z_{0,TE}} = e^{-j\Delta\Phi(y)} = -\Gamma_{TM}. \quad \text{Equation (16)}$$

Relationships akin to Equations (11) and (14) have been derived, to various degrees of generality. In some embodiments, a coefficient profile of a metasurface is correctly approximated by using equations (12) and (16) for a linear phase gradient. The preceding analysis shows, with the full rigor of Maxwell's equations, that retroreflection of the full power of an incident plane wave, at any incidence angle, and with either TM or TE polarization, is possible. Moreover, such full power retroreflection is achievable using an aptly designed passive metasurface with surface impedances described by equations (11) and (14), or equivalently with reflection coefficients described by (12) and (16).

B. Discretization and Retroreflection Metasurfaces

Implementation of a discretized metasurface, having subwavelength-sized cells, each of which is implemented to achieved the desired electromagnetic property (e.g. surface susceptibility or surface impedance, is more facile than the implementation of a continuous metasurface), and coarser discretization (having cells of greater-than subwavelength-sized cells), is possible for selected reflection surfaces. Coarse discretization benefits metasurface design by, first, reducing the mutual coupling between metasurface elements, and second, by relaxing the tolerances of a retroreflective metasurface, allowing for cost-effective (e.g., less expensive) and robust metasurface fabrication for incident EM wave well into the mm-wave frequencies. A brief discussion of design of an aggressively discretized retroreflection metasurface is provided below.

Figure 3A:
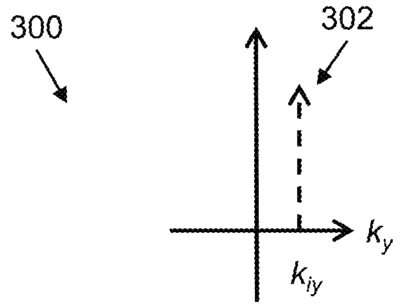
FIGS. 3A-3C are diagrams of spatial and spectral transformation of a plane wave's transverse (y-directed) wave vector, in accordance with some embodiments.

FIG. 3A is a spectral diagram 300 of the transformation of a plane wave's transverse (y-directed) wave vector 302, as the plane wave is reflected from a periodic metasurface. Arrows indicate the spatial frequencies of possible spectral components, but arrow lengths do not reflect the relative amplitudes of these components.

Figure 3B:
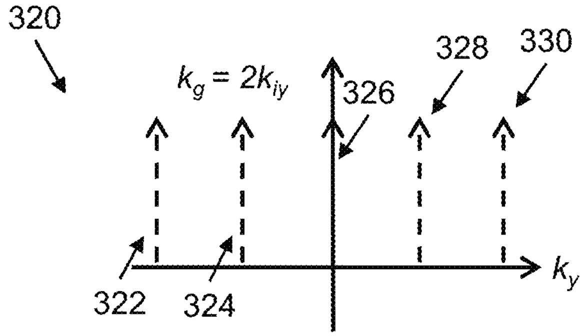

In FIG. 3B, is a diagram 320 spatial frequencies 322, 324, 326, 328, and 330 of reflections of an incident transverse (y-directed) plane wave vector 302 from a retroreflection metasurface. These spatial frequencies map straightforwardly into the angular domain through Equation (17)

$$\sin\theta = \frac{k_y}{k_0} \text{ for } k_y \le k_0, \quad \text{Equation (17)}$$

where $\theta$=is the angle of incident, $k_0$=is the incident wave number (vector), and $k_y$=is the component of the wave number (vector) in the y direction.

Figure 3C:
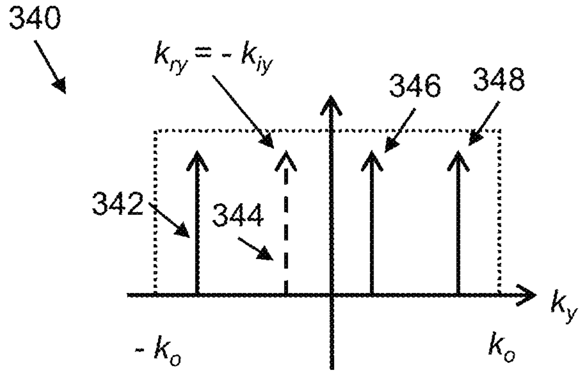

FIG. 3C is a diagram 340 of the spectral components 342, 344, 346, and 348 of reflected wave vector 302. Note that the arrows that represent the spectral components do not represent the amplitudes or phases of the spectral components. As seen, the spectral components 342-348 represent a series of diffraction orders which reflect in different directions. The transverse spatial frequencies of diffracted orders are described by Equation (18):

$$k_{my} = k_{iy} + mk_g = k_{iy} + m\frac{2\pi}{\Lambda_g}, \quad \text{Equation (18)}$$

where:

$k_{my}$=represents the diffraction order wave number (vector), $k_{iy}$ represents the incident wave number (vector) in the y direction, m represents the diffraction order number, $k_g$ represents the spatial frequency of the metasurface, and $\Lambda_g$ represents the period of the metasurface.

To generate a retroreflection metasurface, the m=−1 diffraction order is tuned into the retroreflection order by choosing $\Lambda_g$ appropriately:

$$k_{ry} = k_{iy} - \frac{2\pi}{\Lambda_g} = -k_{iy} \quad \text{Equation (19)}$$

-continued $$\Rightarrow \Lambda_g = \frac{\lambda_0}{2 \sin \theta_i}$$

For a metasurface which implements the surface impedance profile described by Equations (11) and (14), power diffraction increases for the retroreflection mode and vanishes for other propagating modes.

With $\Lambda_g$, and thereby $k_g$, fixed to achieve retroreflection at a predefined angle, there exists a fixed number of reflected propagation waves, which are described by:

$$N = \left\lceil \frac{2k_0}{k_g} \right\rceil \quad \text{Equation (20)}$$

where $\lceil \cdot \rceil$ is the ceiling (round up) operator, $k_0$=is the incident wave number (vector), and $k_g$=represents the spatial frequency of the metasurface.

In some embodiments, increasing metasurface discretization involves reducing the number of cells N of the metasurface period. Maximizing metasurface discretization involves reducing the number of cells N cells per metasurface period as much as possible, while still providing sufficient degrees of freedom to tune the amplitude and phase of each diffraction order. The degree of such maximization, and the number N of cells per metasurface period to achieve the maximization, is demonstrable using Fourier analysis. For a retroreflector, the number of cells N for metasurface discretization is simplified to:

$$N = 2 \times \left\lfloor \frac{k_0}{k_g} \right\rceil, \quad \text{Equation (21)}$$

where $\lceil \cdot \rceil$ is the rounding operator. Combining equations (17), (19), and (21), for a sufficiently large angle incidence, the number of cells per metasurface period is found to be:

$$\theta_i \geq 19.5° \Rightarrow k_g > \tfrac{2}{3} k_0 \Rightarrow N = 3 \quad \text{Equation (22)}$$

Hence for angles of incidence beyond 19.5°, the retroreflection metasurface can be most aggressively discretized to have only two cells per grating period. A case for minimum discretization concurs with the article published by A. Hessel, J. Schmoys, and D. Y. Tseng, *Bragg-angle blazing of diffraction gratings*, J. Opt. Soc. Am., vol. 65, no. 4, pp. 380-383, April 1975. Application of Equations (13) and (16) shows that the two cells exhibits near-full reflection amplitude (e.g., "perfect" reflection, or reflection of nearly 100% of the incident EM waveform) and 180° relative phase shift. A description of the design and simulation of TE and TM metasurfaces which achieve near-full reflection amplitude and 180° relative phase shift follows below.

Metasurface Simulation and Design

Figure 4A:
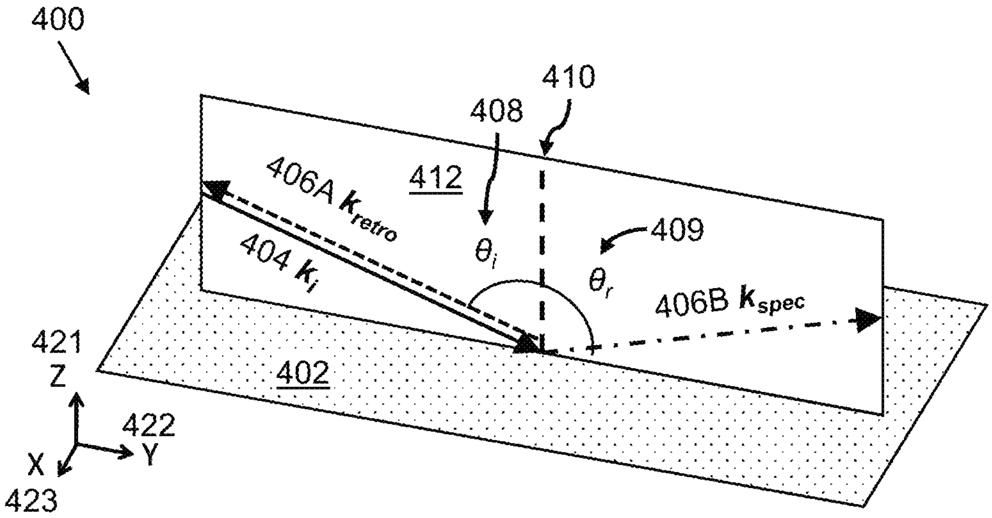
FIG. 4A is a diagram of a monostatic RCS measurement of a metasurface, in accordance with some embodiments.

FIG. 4A is a diagram of a retroreflection model 400 from a metasurface 402 with incident 404 and reflected 406A, 406B EM waves, according to some embodiments. Reflected EM wave 406A is a retroreflected EM wave, returning along the incident direction of incident EM wave 404. Reflected EM wave 406B is a specular reflected EM wave. Incident angle $\theta_r$ 408 is measured from a reference line 410 normal to a top surface of metasurface 402. In retroreflection, when incident angle $\theta_r$ 408 is positive ($\theta_i$>0) and is on one side of reference line 41$\theta_i$ specular reflected EM wave 406B has a reflection angle $\theta_{r,spec}$ 409 that is positive ($\theta_{r,spec}$>0) on the opposite side of reference line 410. Thus, reflected wave 406A has a reflection angle ($\theta_{r,retro}$>$\theta-_i$). Incident and reflected EM waves shown in retroreflection model 400 are contained in a reflection plane 412 described by the yz plane (see z-axis 421 and y-axis 422), with the x-axis 423 being perpendicular to reflection plane 412.

Whereas a smooth surface reflects incident EM waves 404 in the specular direction (see 406B), a controlled-reflection metasurface is configured to reflect light in a direction other than the specular direction. Some embodiments of controlled-reflection metasurfaces reflect incident EM waves (see incident wave 404) in the retro direction (see, e.g., reflected EM wave 406A). Some embodiments of controlled-reflection metasurfaces reflect incident EM waves the retro direction, back toward an EM wave source (not shown). For a TE polarized wave, the E-field points to the x-direction; for a TM polarized wave, the H-field points to the x-direction. In the present disclosure, design of a metasurface that emanates two diffraction orders—the specular (m=0) and retroreflection (m=−1) orders, is presented. By appropriate metasurface design it is possible to significantly suppress specular reflection and hence create an efficient retroreflector. The present disclosure discusses a 24 GHz incident wave impinging on a metasurface at a near-grazing incident angle of $\theta_i$=82.87°. It is noteworthy that the example incident angle and EM wave frequency are merely intended for clarity of discussion of the principles involved with designing and making controlled-reflection waves. Other incident angles and wave frequencies are envisioned within the scope of the present disclosure. Substituting the incident angle and EM wave frequency into equation (19), the metasurface period $\Lambda_g$ is found to be:

$$\Lambda_g = 6.30 \text{ mm} \quad \text{Equation (23)}$$

The unit cell size $U_y$ is determined by Equation (24) for a metasurface period discretized into two cells:

$$U_y = \frac{\Lambda_g}{2} = 3.15 \text{ mm}. \quad \text{Equation (24)}$$

Figure 4B:
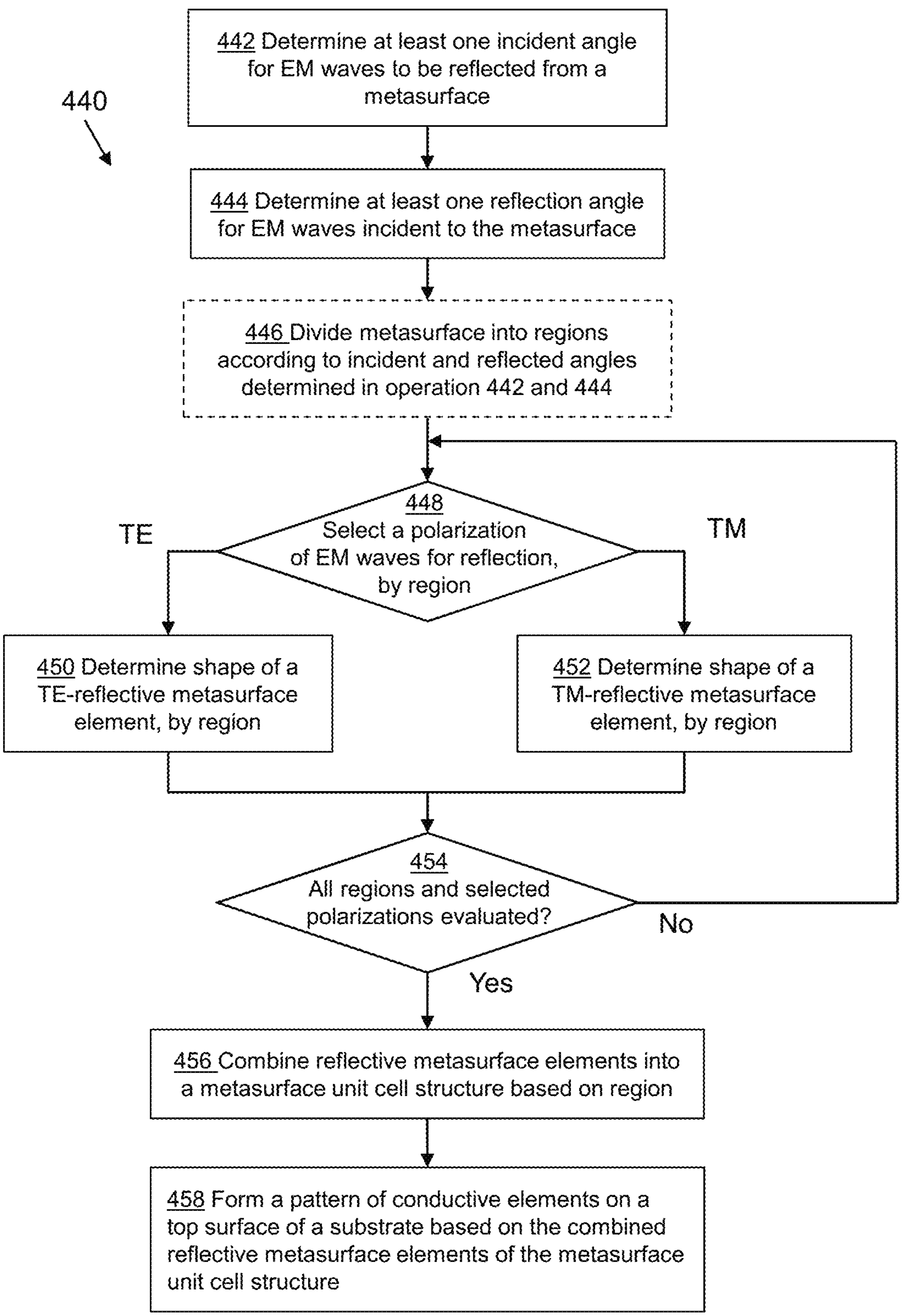
FIG. 4B is a flow diagram of a method of designing and making a metasurface, in accordance with some embodiments.

FIG. 4B is a flow diagram of a method 440 of designing and making a metasurface with controlled-reflection characteristics, according to some embodiments of the present disclosure. A metasurface design is determined by performing an operation 442 in which the incident angle of the EM waves that are to reflect from a metasurface is selected to determine the metasurface configuration. In some embodiments, the incident angle of EM waves to reflect from the metasurface ranges from about 10° to about 88°. In some embodiments, the incident angle of EM waves is greater than 75° and less than 90°.

Method 440 proceeds with operation 444, in which at least one reflection angle is selected for the EM waves incident to the metasurface. In some embodiments, the reflection angle is negative, and the EM wave reflects generally back toward the EM wave source or horn. In some embodiments, the reflection angle is equal to the negative incidence angle of the EM wave (e.g., $\theta_r$=−$\theta_i$). In some embodiments, the reflection angle is positive, but has a different magnitude than the incidence angle.

Method 440 proceeds with an optional operation 446, in which the metasurface is divided into regions according to a number of incident angles and reflected angles selected in operations 442 and 444, previously.

Method 440 proceeds with operation 448, in which the polarizations of the EM waves to reflect off the metasurface are selected. In some embodiments, the metasurface is configured to controllably-reflect TE-polarized EM waves. In some embodiments, the metasurface is configured to controllably-reflect TM-polarized EM waves. In some embodiments, the metasurface is configured to controllably-reflect both TE- and TM-polarized EM waves.

When a TE-polarized incident EM wave is selected for controlled reflection, the method 440 proceeds with operation 45$\theta_i$ wherein the shape of a conductive element of a TE-reflective metasurface is determined. Operations associated with determining a shape of a TE-reflective metasurface are described hereinabove, and are described further by equations (1)-(16), associated with the determining the dimensions of both a unit cell of a metasurface and shape/dimensions of conductive elements thereon.

When a TM-polarized incident EM wave is selected for controlled reflection, the method 440 proceeds with operation 452, wherein the shape of a conductive element of a TM-reflective metasurface is determined. Operations associated with determining the shape of a TM-reflective metasurface are described hereinabove, and are described further by equations (1)-(16), associated with the determining the dimensions of both a unit cell of a metasurface and shape/dimensions of conductive elements thereon.

Method 440 proceeds with operation 454, wherein it is determined whether all regions and all polarizations, as determined in operations 442-446, have been evaluated to determine the metasurface design or layout. When not all regions or polarizations have been evaluated, the method proceeds to operation 448.

Method 440 proceeds with operation 456, wherein the metasurface elements are combined into a metasurface layout by region, in order to perform the controlled reflection that is sought after operations 442-446 have been completed. According to some embodiments, a first region of a metasurface is configured to controllably-reflect both the incident TE- and TM-polarized portions of an EM wave at a same reflection angle. In some embodiments, a first region of a metasurface is configured to controllably-reflect both incident TE- and TM-polarized portions of an EM wave, where TE-polarized EM waves are reflected at a first reflection angle and TM-polarized EM waves are reflected at a second reflection angle. In some embodiments, a first region of a metasurface is configured to specularly reflect one portion (or polarization) of an incident EM wave, and controllably-reflect a majority of the other portion (or polarization) of the incident EM wave. In some embodiments, a first region of a metasurface is configured to reflect an incident EM wave (both TE and TM polarizations) at a first reflection angle and a second region of the metasurface reflects the incident EM wave (both TE and TM polarizations) at a second reflection angle, different from the first reflection angle. In other words, the present disclosure provides a methodology of designing a metasurface that allows for reflecting portions of more than one EM wave, at more than one incident angle, at more than one reflection angle, and handling the TE and TM polarized portions of the more than one EM wave independently.

Method 440 proceeds with operation 458, wherein a pattern of conductive (metallic) elements on a top surface of an insulating material, the pattern corresponding to the metasurface layout, by region, formed during operation 456.

In a non-limiting embodiment, a metasurface is manufactured using a Rogers RT/Duroid 5880 laminate board with ½ oz. copper cladding on both sides. According to some embodiments, the metasurface is constructed from an insulating material, or insulating substrate, or dielectric material, with a conductive ground plane on a first, or bottom, side of the insulating substrate, and a series of unit cells with conductive elements located therein on a second, or top, side of the insulating substrate. According to some embodiments, the insulating substrate is an insulator material suitable for printed circuit board or microstrip manufacturing. According to some embodiments, the insulating substrate is polyimide, polyethylene, polypropylene, polyisocyanate, polytetrafluoroethylene (PTFE), fiberglass, or some other non-conductive inorganic or organic material that electrically isolates the conductive ground plane from the conductive elements on the top of the insulating substrate. According to some embodiments, the conductive ground plane and the conductive elements on the top surface of the insulating substrate are a same metal. According to some embodiments, the conductive ground plane and conductive elements on the top surface of the insulating substrate are different metals. Some embodiments of metasurfaces include, but are not limited to, metals such as copper, aluminum, nickel, silver, gold, brass, and alloys of these and other metals.

A pattern of conductive or metallic elements on a top surface of an insulating material is formed, according to some embodiments, by masking a portion of a blanket metallic film on a top side of the insulating material, with a removable mask, and subsequently etching the conductive or metallic layer on the top side with an acid, or by sputtering or abrading the material away from within the openings of the removable mask. In some embodiments, the ground plane on the bottom side of the insulating material has a same composition and a same thickness as a conductive or metallic film on the top side of the insulating material. In some embodiments, the ground plane is also masked, with a blanket mask material, to protect the conductive or metallic material of the ground plane from the etching process that forms the pattern of conductive elements on the top surface of the insulating material during operation 458. According to some embodiments, a first region, having a first layout, and a second region, having a second layout, are formed in a same pattern forming operation.

TE Metasurface Element Design

For the TE polarization, a reflection coefficient is implemented using a ground-backed dipole array. A ground-backed dipole array contains Huygens' source characteristics when operated in reflection mode. Further, by tuning the length of the dipole one can vary the phase of $\Gamma_{TE}$ by a phase range approaching 360°, with minimal loss.

Figure 5A:
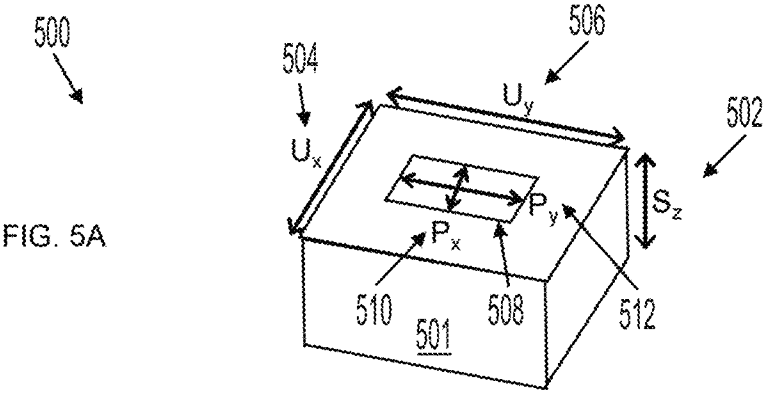
FIG. 5A is a diagram of a metasurface, in accordance with some embodiments.

FIG. 5A is a diagram of a metasurface unit cell 500, where the metasurface is TE-reflective and includes a ground-backed dipole array. Metasurface unit cell 500 has a cell thickness 502 $S_z$ with a unit cell length 504 $U_x$ and a cell width 506 $U_y$. The ground-backed dipole 508 has a dipole length 510 $P_x$ and a dipole width $P_y$512. According to a non-limiting embodiment, the metasurface unit cell 500 is made on a Rogers RT/Duroid 5880 Laminate board from Rogers Corp., with a cell thickness $S_z$=1.575 mm and ½ oz. copper cladding. According to some embodiments, and as described above in Equation (23), an aggressively discretized unit cell for retroreflection of an incident a square cell profile, where $U_x$=$U_y$=3.15 mm, and where the ground-backed dipole has a square dipole profile $P_x$=$P_y$=0.5 mm. According to some embodiments, a ground-backed dipole is a conductive element on a top surface of an insulating material 501, as described hereinbelow, that is discontinuous from conductive elements in unit cells of the metasurface that adjoin the unit cell containing the ground-backed dipole. For example, ground-backed dipole 508 is surrounded by an air gap at a top surface of an insulating material, as shown in FIG. 5A.

Figure 5B:
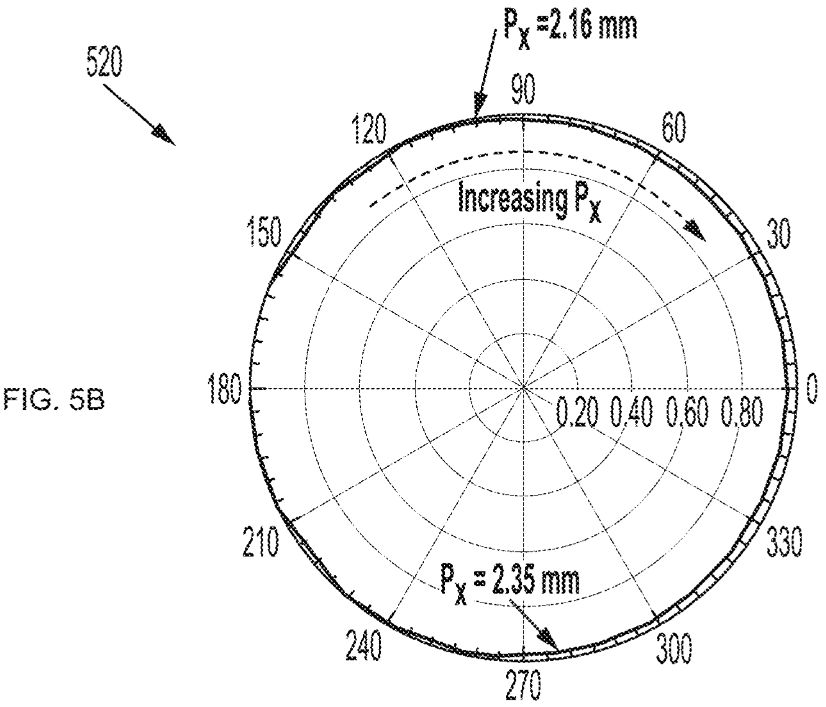
FIG. 5B is a diagram of a simulated monostatic RCS measurement of a metasurface, in accordance with some embodiments.

FIG. 5B is a diagram of a simulated RCS measurement 520 the TE reflection coefficient FTE as a function of the dipole length for unit cell 500 described by FIG. 5A, using Ansys HFSS full-wave electromagnetic simulation. Unit cell 500 has periodic boundaries in the x and y directions, with phase shifts corresponding to an incident wave at $\theta_i$=−82.87°, a Floquet waveport from the +z boundary, but with a dipole length ranging from $P_x$=1.5 mm to 3 mm for simulation purposes. Simulation results show a phase change approaching 360° with relatively low energy loss (less than 5% for nearly according to the diagram 520). As noted in diagram 520 operation points $P_{x1}$=2.16 mm and $P_{x2}$=2.35 mm differ in phase by about 180°. Thus, $P_{x1}$=2.16 mm and $P_{x2}$=2.35 mm are selected to be the operating points of a retroreflection metasurface for TE polarizations.

Figure 5C:
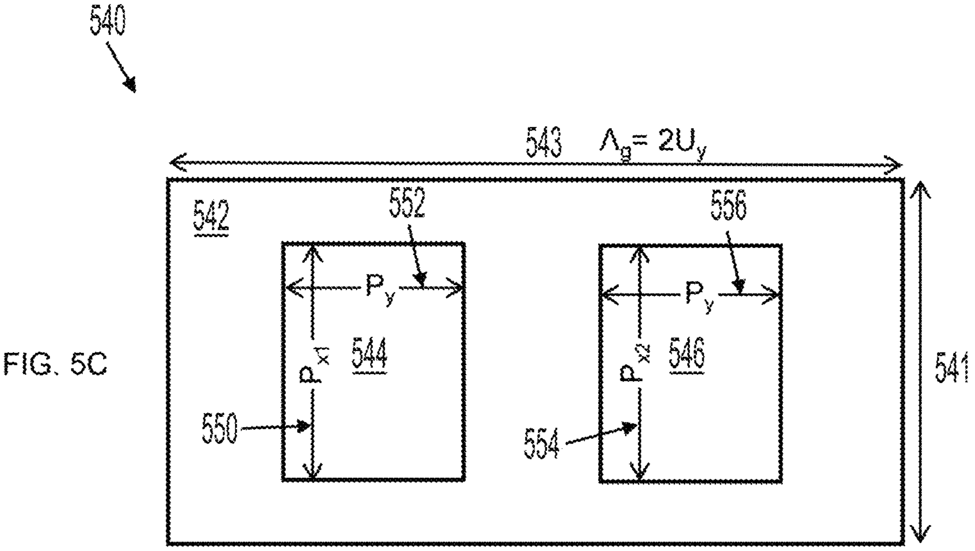
FIG. 5C is a diagram of an effective area of a metasurface, in accordance with some embodiments.

FIG. 5C is top view of an effective area or active area of a two cell TE-retroreflective metasurface 540, according to some embodiments. In some embodiments, TE-reflective metasurface element 542 has a cell length dimensions $U_x$ 541 =$U_y$ 543 =3.149 mm, $S_z$=1.575 mm, $P_y$ 552, 556 =0.5 mm, although other [see above, FIG. 5A] The dipole width $P_y$=1.5 mm, and dipole lengths $P_{x1}$ 550 =2.16 mm, $P_{x2}$554=2.35 mm, are configured to generate high-efficiency retroreflection of an incident 24 GHz TE polarized waveform at an incident angle of $\theta_i$=−82.87°.

Simulation of Period Metasurfaces

After selection of the dipole cell lengths $P_{x1}$ and $P_{x2}$, the dipoles 544, 546 are placed adjacent to each other and the scattering properties of the resultant binary Huygens' metasurface are simulated. FIG. 5C shows a top view of one period of this metasurface. A first simulation of a 2D infinitely periodic extension of the metasurface is performed using the Floquet simulation described above for the single element analysis. According to some embodiments, from the first simulation, the scattered power into the retro and specular modes to be 94% and 6% respectively. The first simulation demonstrates very efficient retroreflection and suppression of specular reflection. According to some embodiments, in a second simulation the metasurface is truncated to 136 cells in the y-direction to simulate the scattering characteristics of a finite metasurface. The second simulation is periodic in the x-direction—where the fields are invariant from element to element—to conserve computational resources.

Figure 6A:
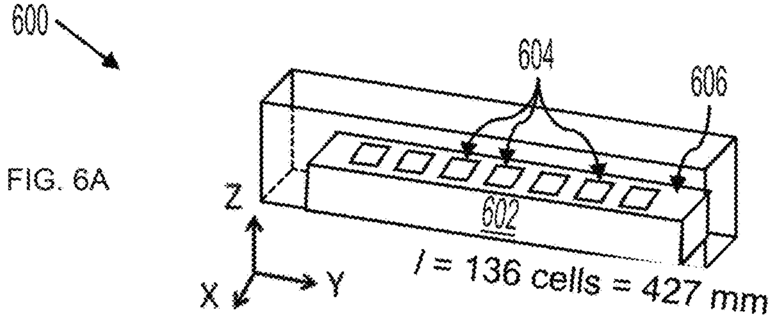
FIG. 6A is a diagram of a truncated TM-reflective metasurface, in accordance with some embodiments.

FIG. 6A is a diagram of a truncated (1D finite) TM retroreflection metasurface 600 used for simulation purposes as described hereinafter in the discussion of FIGS. 6B-6C according to some embodiments. Metasurface 600 includes a substrate 602 and a plurality of ground-backed dipoles 604 arranged on/embedded in a top surface 606 of substrate 602. As part of the simulation, the metasurface 600 is surrounded by an air gap of $\lambda_0/2$ in the ±x- and ±z-directions to simulate radiation boundaries using perfectly matched layers.

Figure 6B:
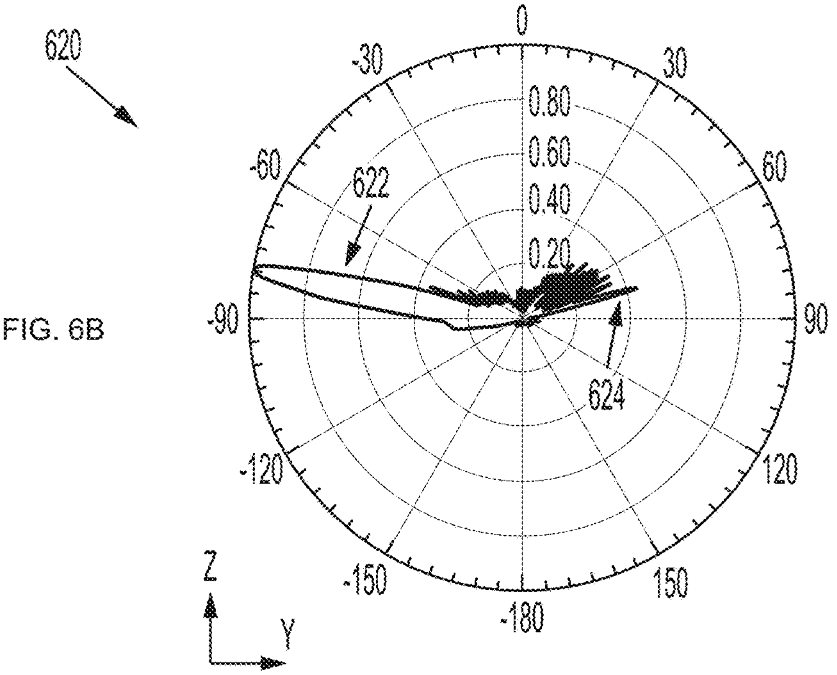
FIG. 6B is a diagram of a simulated RCS measurement of a TM-reflective metasurface, in accordance with some embodiments.

FIG. 6B is a diagram 620 a simulated bistatic radiation cross section (a bistatic RCS) measurement of the truncated TM retroreflection metasurface 600 of FIG. 6A, in the φ=90° plane (yz-plane) upon illumination of a plane wave at 82.87°, according to some embodiments. Diagram 620 exhibits a node 622 associated with strong retroreflection, along with a node 624 associated with weak specular reflection.

Figure 6C:
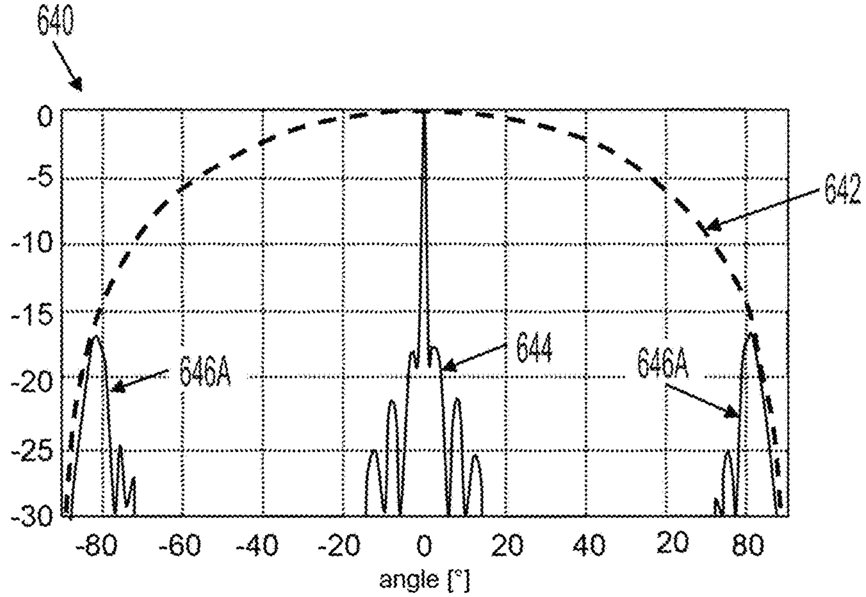
FIG. 6C is a comparison diagram of the monostatic RCS measurement of two surfaces, in accordance with some embodiments.
Figure 7:
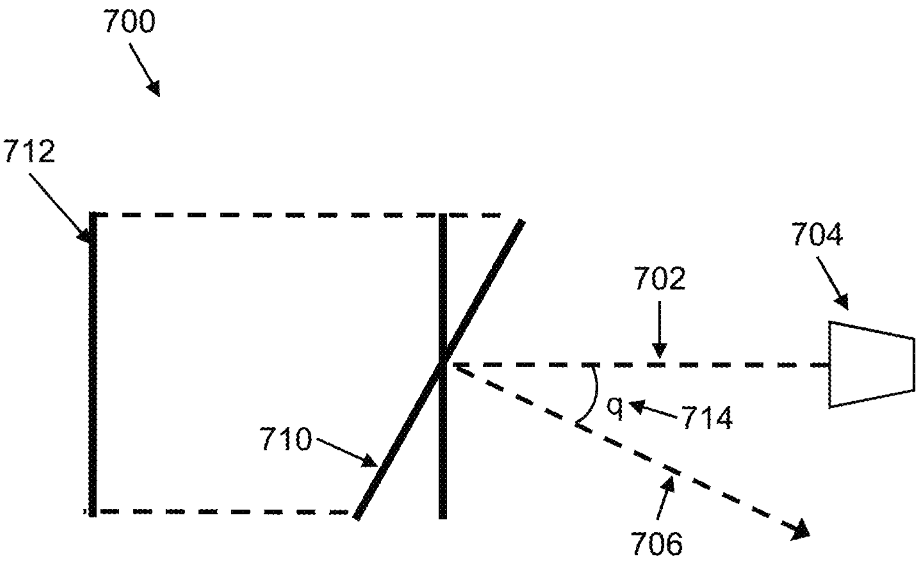
FIG. 7 is a diagram of a monostatic RCS setup, in accordance with some embodiments.

FIG. 6C is a comparison diagram of the monostatic RCS 640 in the Φ=90° plane (yz-plane) of two surfaces. The dashed line indicates the measured signal 642 associated with the power of a EM wave reflected from a copper plate. Peaks 644 and 646A-B are associated with the power of an EM wave reflected from a controlled-reflection metasurface, according to some embodiments. To clarify the method of measuring signal strengths shown in FIG. 6C, refer to FIG. 7, a non-limiting embodiment of an RCS measurement apparatus 700. In FIG. 7, an emitter or horn 704 emits an EM wave 702 that strikes metasurface 710 and reflects as a reflected EM wave 706 at an illumination angle (q) 714. Effective aperture 712 is calculated by multiplying the area of the metasurface 710 by the illumination angle (q) 714 that the horn, or emitter, makes with the normal of the metasurface. In some embodiments of RCS measurements, the horn 704 is configured to emit a TM polarized waveform. In some embodiments of RCS measurements, the horn 704 is configured to emit a TE polarized waveform. The radiation (or reflection) cross section of a metasurface is determined by emitting recording the strength of the reflected EM wave 706 as a function of the illumination angle 714. The size of an effective aperture 712 scales with cos θ, and the radiation cross section of metasurface 710 scales with $\cos^2\theta$. Because a metal plate illuminated from broadside (e.g., the incident angle is 0°), reflects with 100% aperture efficiency, the monostatic RCS of a copper (or metallic) plate provides a reference for evaluating metasurface reflection efficiency after accounting for the size of the aperture. In a non-limiting embodiment, at an incident angle of ±82°, a binary Huygens' metasurface achieves an RCS of −0.3 dB compared to a copper plate, equivalent to an aperture efficiency of 93%. Thus, efficient retroreflection is achievable at and/or near the angle of designed retroreflection.

TM Metasurface Element Design

Metasurfaces that exhibit controlled reflection of TM-polarized waveforms are designed in a manner similar to that described previously for incident TM waveforms, but with a different metasurface element. At near-grazing angles, the electric field component of a TM-polarized wave points predominantly in the z-(vertical) direction with respect to the metasurface. Thus, the electric field component of a TM-polarized waveform couples ineffectively to a metallic dipole strip elements on the metasurface. Instead, an array of slots is used to couple to the magnetic field component of the TM-polarized wave, the Babinet's equivalent to the dipole array of FIG. 6A.

Figure 8A:
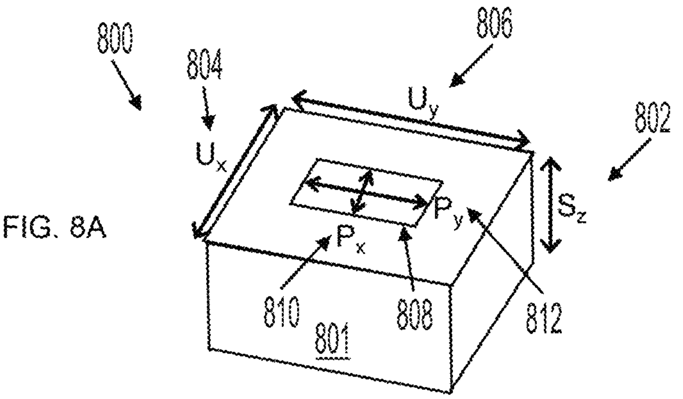
FIG. 8A is a diagram of a unit cell of a TM-reflective metasurface, in accordance with some embodiments.

FIG. 8A is a diagram of a unit cell 800 of a metasurface 801, according to some embodiments. In a non-limiting embodiment, metasurface 801 is a TM-reflective metasurface with a thickness $S_z$ 802 with a unit cell length $U_x$ 804 and a cell width $U_y$ 806. In unit cell 800, a cell element that interacts with an incident TM-polarized EM waveform is slot 808 having a slot length $P_x$ 810 and a slot width $P_y$ 812. In some embodiments, thickness $S_z$=3.175 mm (125 mil). In some embodiments, the periodicity of the cell is the same as the periodicity of the TE counterpart discussed previously ($U_x$=$U_y$=3.149 mm).

By adjusting the length of the dipole $P_x$, coupling dynamic between the ground-backed slot array and the incoming/outgoing waves is adjusted, which in turn adjusts the reflection coefficient $\Gamma_{TM}$ of the metasurface. By adjusting the reflection coefficient of a metasurface, the relationship between the incident angle and reflected angle of an EM waveform is adjusted in different embodiments of controlled reflection/retroreflective metasurfaces.

Figure 8B:
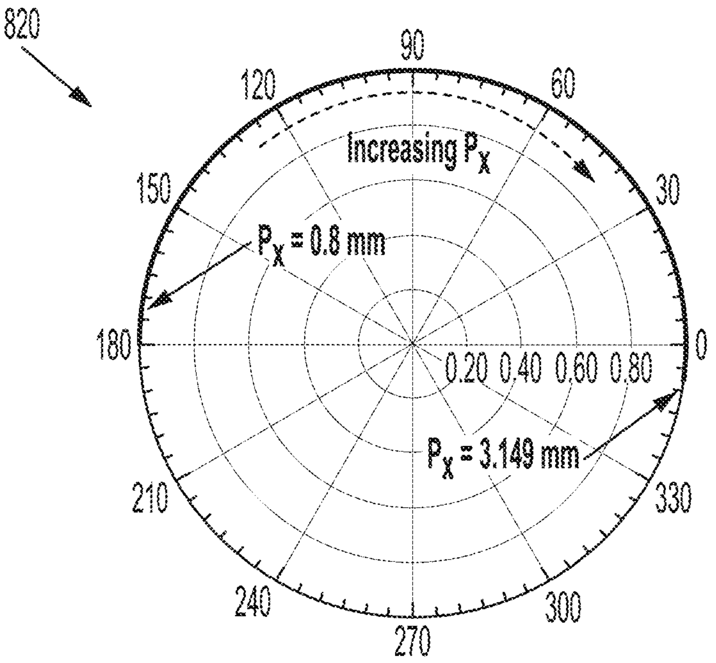
FIG. 8B is a diagram of reflection coefficient of a metasurface with a slot array, in accordance with some embodiments.

FIG. 8B is a diagram 820 of simulated reflection coefficient $\Gamma_{TM}$ of a metasurface with a slot array, as a function of the dipole length $P_x$ ranging from 0 to 3.149 mm (the periodicity of the unit cell). Simulations of metasurface performance were performed using the Floquet formulation as previously explained for a TE-polarized metasurface. As can be observed, the reflection coefficient $\Gamma_{TM}$ attains near-unity magnitude, but the phase variation of the reflected EM waveform covers over 190°, which is a notable decrease from the near 360° phase range obtained from the TE counterpart. The decrease in phase variation of reflected EM waveforms is due, in large part, to the fact that by transforming the metasurface from TE to TM operation (controlled reflection/retroreflection), the metasurface retained the original substrate dielectric and the ground plane, whereas in a true Babinet's equivalent the original substrate dielectric and ground plane would be replaced with a material of greater magnetic permeability and a magnetic conductor. For diagram 820 with a less-effective Babinet's equivalent, the reflection response shown is sufficient to perform retroreflection and demonstrate principles of a metasurface configured for controlled reflection of a TM-polarized waveform. Based on diagram 820, initial operation points $P_{x1}$=0.8 mm and $P_{x2}$=3.149 mm are selected to perform a two-cell simulation described hereinbelow by FIG. 8C and supporting sections of the present disclosure for some embodiments of metasurfaces designed for TM-polarized waveforms. Despite the specific dimensions of metasurface 801, the unit cell and slot dimensions used therein are not intended to be limiting to the scope of the present disclosure. The present embodiments addresses all embodiments of passive controlled-reflection and/or retroreflecting metasurfaces with ground-backed dipoles and arrays of slots, for all periodicities and unit cell dimensions, and for all dipole and slot dimensions within the unit cells of the controlled-reflection/retroreflective metasurfaces.

Figure 8C:
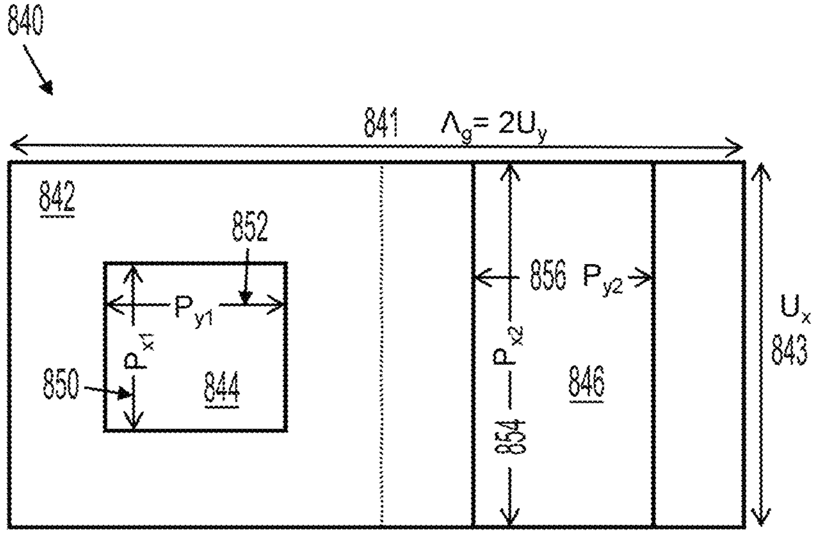
FIG. 8C is a diagram of a metasurface unit cell used for Floquet simulation, according to some embodiments.

FIG. 8C is a top view of a non-limiting embodiment of a metasurface unit cell 840 used for Floquet simulation to give scattering parameters for embodiments of a 2D infinite extension of the binary Huyugens' metasurface. Metasurface unit cell 840 is a TM-reflective element 842 with a cell length $U_x$ 843, an cell width $U_y$ 841, and a dipole 844 with a dipole length $P_{x1}$ 850 and a dipole width $P_{y1}$ 852. Element 842 further has slot 846 with slot length $P_{x2}$ 854 and a slot width $P_{y2}$ 856. In metasurface unit cell 840, cell width 841 is 3.149 mm. In some embodiments, the unit cell length ranges from 1.2 mm up to 3.2 mm, and is responsive to incident EM waves having a wavelength ranging from about 12.5 mm to about 3.7 mm. The present disclosure is anticipated as being applicable to EM waves having a band frequency ranging from about 24 GHz to about 150 GHz, although other band frequencies are also considered to be within the scope of the present disclosure. According to some embodiments, a unit cell of a controlled reflection metasurface has a length ranging from about 0.5 mm to about 3.2 mm, although cell lengths both longer and shorter than the unit cell lengths presented above are also considered within the scope of the present disclosure. While unit cell lengths shorter than 1 mm are sometimes difficult to manufacture according to methods described herein or methods familiar to practitioners of the art, the principle of arbitrary reflection angles using ground-backed diodes and slot arrays as described herein, with appropriate modifications to materials to be compatible with shorter wavelengths (e.g., having band frequencies greater than 150 GHz) are also contemplated by the present disclosure. From the simulation, the scattered power into the retro and specular reflection modes is 84.3% and 15.5%, respectively, of the initial EM waveform. For the simulation disclosed herein, the dipole length $P_{x1}$ that provided the largest reflection efficiency is 1.6 mm, having a reflected power efficiency of 99.1% (retroreflection) and 0% (specular reflection), respectively. Other dipole lengths are envisioned within the scope of the present disclosure, consistent with the ranges of unit cell lengths disclosed hereinabove. In a non-limiting embodiment, a slot, as described herein, refers to a dipole that extends across an entirety of the top surface of a unit cell of a metasurface. In a non-limiting embodiment, a slot is not electrically isolated from a conductive element of an adjoining unit cell of the metasurface.

In some embodiments, and for purposes of simulation, the number of cells in the TM-reflective metasurface in the y-direction is truncated at 136 cells to simulate the scattering characteristics of a finite metasurface. Other numbers of cells of the TM-reflective metasurface are also envisioned for simulation purposes and for manufactured metasurfaces. For purposes of the simulation discussed in the present disclosure, the same boundary conditions are applied for the TM-reflective metasurface as for the TE-reflective metasurface described previously.

Figure 9A:
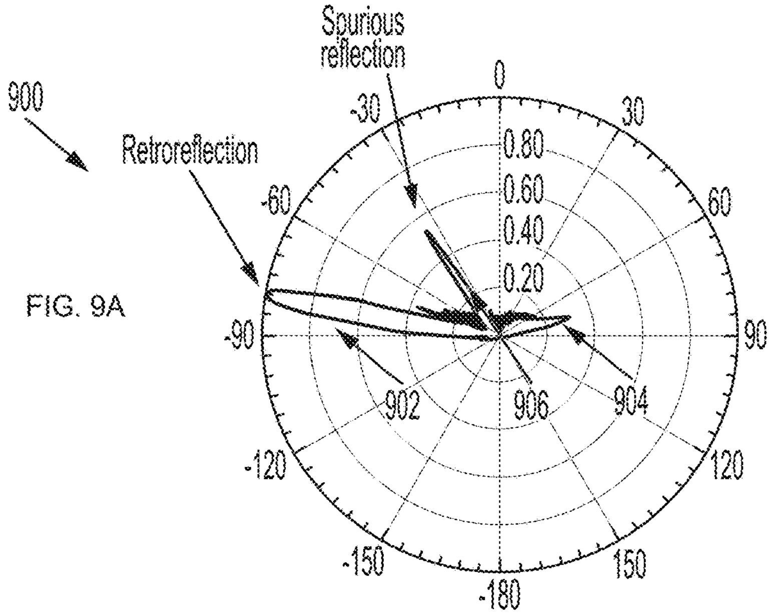
FIGS. 9A-9C are diagrams of simulated RCS measurements from a TM metasurface, according to some embodiments.

FIG. 9A is a diagram of a simulated RCS measurement 900 of a 136-cell structure in the φ=90° plane (yz-plane), with a node 902 corresponding to retroreflection, and a node 904 corresponding to specular reflection. A 906 corresponds to a spurious reflection at 37°, and appears to be related to the coupling of the incident EM wave with the surface waves on the metasurface, which then re-radiate from the metasurface.

Figure 9B:
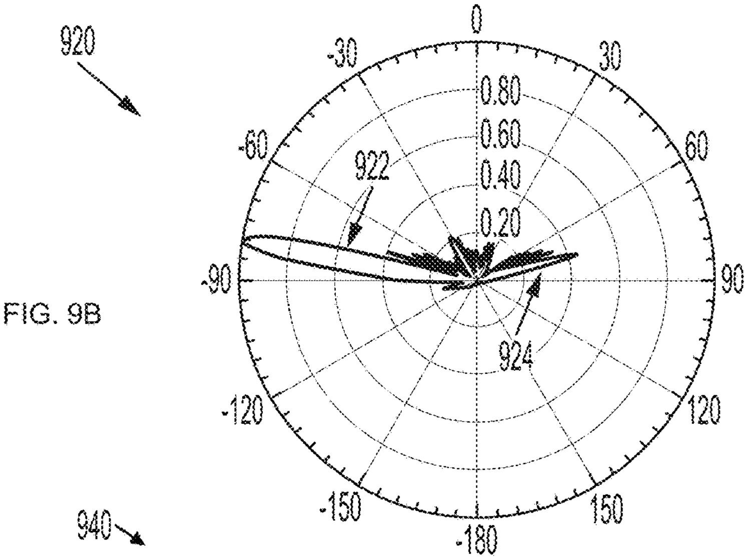

FIG. 9B is a diagram of a simulated RCS measurement 920 of the radiation pattern of a metasurface similar to that used for the simulation results plotted in FIG. 9A, with the addition of a lossy material at each end of the 1D metastructure to promote dissipation of surface waves after the incident EM wave couples with the metasurface. In a non-limiting embodiment of a lossy material, FR4 is lossy with regard to 24 GHz and 77 GHz EM waves, according to some embodiments of the present disclosure. Other lossy materials, whether familiar to or discoverable by practitioners of the art, are also anticipated by and considered within the scope of the present disclosure as being compatible with controlled-reflection, including retroreflection, metasurfaces described herein. In FIG. 9B, the simulation indicates that an incident EM wave produces a node 922 corresponding to a strong retroreflection and a node 924 corresponding to weak specular reflection, and further indicates that the node 906 corresponds to spurious reflection of simulated RCS measurement 900 is greatly diminished or absent. In FIG. 9B, the strength of the node 922 (retroreflection) is reduced by 0.8 db as compared to node 902 in FIG. 9A, and the strength of the node 924 (specular reflection) is increased by 2.2 dB, as compared to the node 904 in FIG. 9A, by the addition of the lossy material at the ends of the 1D metasurface. Thus, the addition of lossy materials has the effect, in some embodiments of controlled-reflection metasurfaces, of reduced spurious reflections, but at the cost of increased specular reflection strength.

Figure 9C:
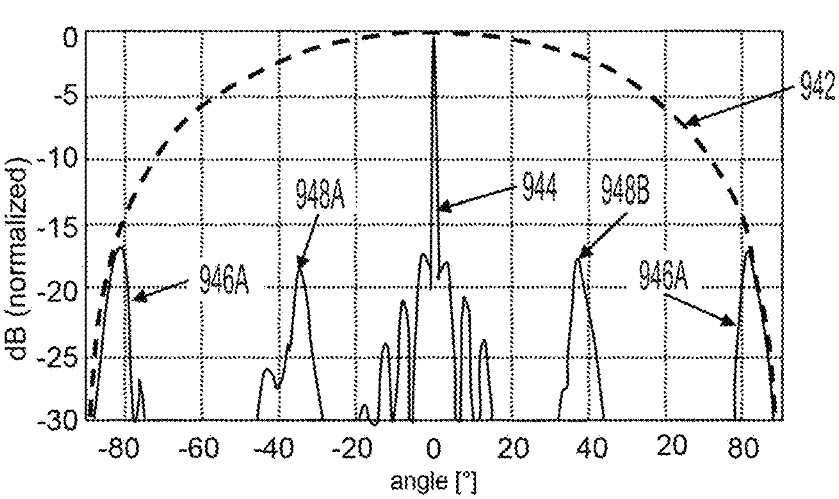

FIG. 9C is a comparison diagram 940 that shows the simulated monostatic RCS measurement (nodes 944, 946A-B, 948A-B), in the φ=90° plane (yz-plane) of a TE-reflective metasurface and a simulated measurement 942 of a reflection from a copper plate. In comparison diagram 940, nearly 100% retroreflection occurs at ±82° when considering the effective aperture of the board. The dotted red line indicates the maximum power that could be reflected given the size of the board, and it is quite visible that the retroreflective property of the board is very efficient.

Figure 10A:
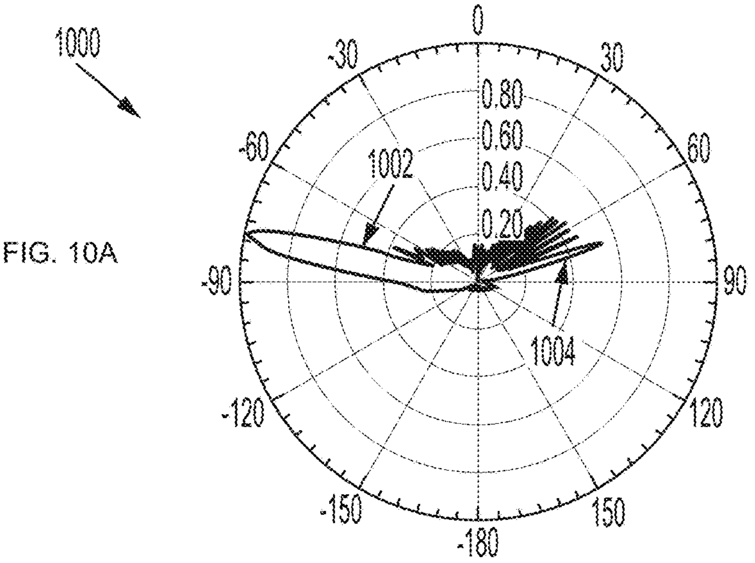
FIGS. 10A-C are diagrams of simulated RCS measurements of metasurfaces, in accordance with some embodiments.
Figure 10B:
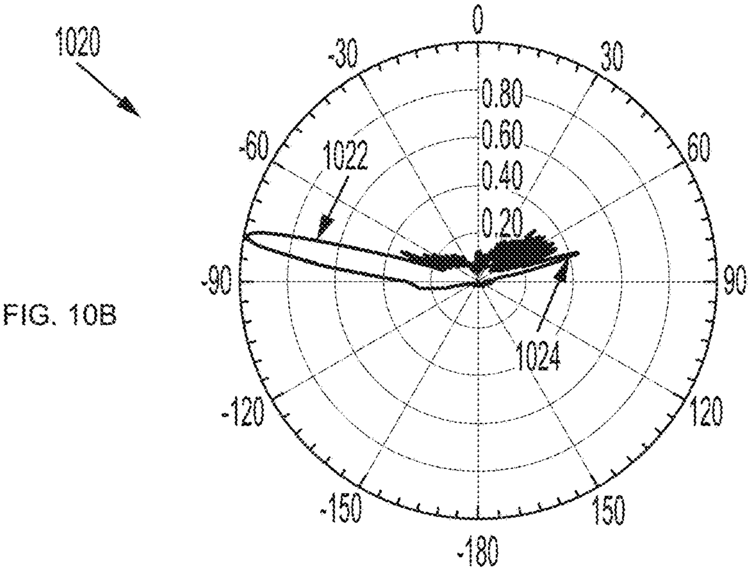
Figure 10C:
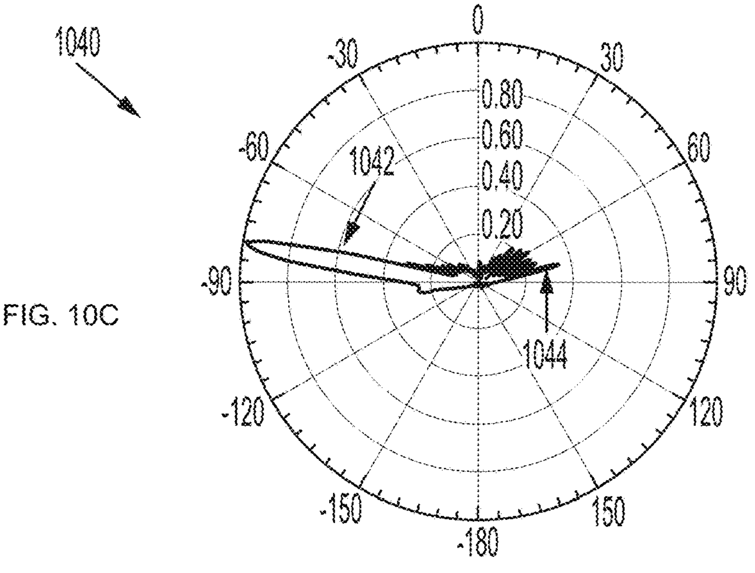

Metasurface adjustment is an important aspect of designing and manufacturing metasurfaces. Determining a number of metasurface unit cells in a controlled-reflection metasurface is relevant to the strength of the reflected EM waves that arise from the metasurface. A number of metasurface elements is also relevant to the direction of the reflected EM wave that arises from the metasurface. In FIG. 9A, node 902 is a retroreflected 2.4 GHz EM wave, and is strongest (maximal) at −80°, whereas the designed angle of retroreflection for the metasurface was −82.87°. The difference between the actual and designed retroreflection maxima is due to the finite size of the metasurface. In some embodiments, increasing the expected angle of incidence is one method of counteracting the difference between measured reflection angle associated with a finite metasurface, as compared to a designed reflection angle associated with a "perfect" or infinite metasurface. In some embodiments, increasing the size of the metasurface shifts the angle of reflection of an EM wave from a metasurface closer to the designed reflection angle associated with a "perfect" or infinite metasurface. In FIGS. 10A-10C, the size of the modelled metasurface increases from 100 cells to 200 cells, and the reflected angle changes from −79° to −81° for an incident 2.4 GHz EM wave.

FIG. 10A is a diagram of a simulated RCS measurement 1000 of a TE-reflective metasurface having 100 cells in a one-dimensional (1D) array. Node 1002 (retroreflection) has a maximum or strongest intensity at −79°.

FIG. 10B is a diagram of a simulated RCS measurement 1020 of a simulated TE-reflective metasurface having 136 cells in a 1D array. Node 1022 (retroreflection) has a maximum or strongest intensity at −80°.

FIG. 10C is a diagram of a simulated RCS measurement 1040 of a simulated TE-reflective metasurface having 200 cells in a 1D array. Node 1042 (retroreflection) has a maximum or strongest intensity at −81°. As the number of cells in the simulated 1D array increases, the strength of the specular reflection node decreases from specular reflection node 1004, the largest of the three nodes presented herein following simulated RCS measurements, to node 1024 (specular reflection), to node 1044, the smallest of the specular reflection nodes.

TE-Reflective Metasurface Reflection Measurement

Figure 11A:
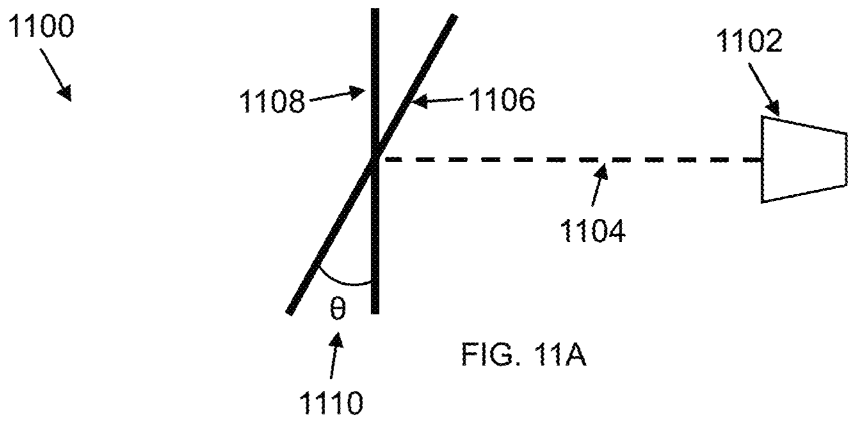
FIG. 11A is a diagram of a monostatic RCS measurement, in accordance with some embodiments.
Figure 11B:
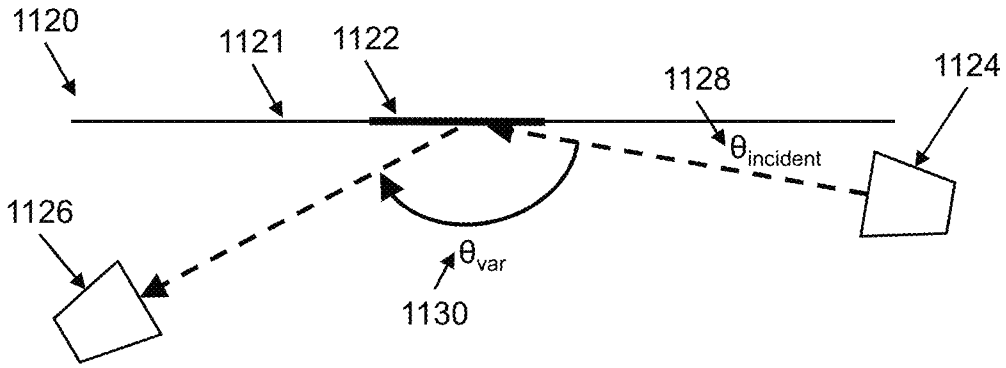
FIG. 11B is a diagram of a bistatic RCS measurement setup, in accordance with some embodiments.

A TE-reflective metasurface was fabricated with 136 cells in the y-direction (the same number of cells used for the 1D finite simulation described above in FIG. 9B), and 87 cells in the x-direction, having a total area of 428 mm×275 mm. Two types of measurements were done; monostatic and bistatic radar cross-sections (RCS). FIGS. 11A-B show the monostatic and bistatic RCS setup. According to some embodiments, the number of cells in the y-direction and the x-direction is variable according to the reflection accuracy, and to the reflection.

Monostatic RCS measurements described herein were carried out in an anechoic chamber, with a vertically polarized, K-band horn on one end of the chamber, and a metasurface on a rotatable stage 5.3 m away from the horn. This distance corresponds to the far-field of an incident EM wave. A $S_{11}$ signal is the retroreflected scattering parameter for monostatic RCS antenna. As a reflected signal increases in strength (e.g., approaching unity), the greater the detection distance of the reflected signal. Similarly, a stronger reflection signal corresponds to an improved signal to noise ratio to distinguish a reflected signal from clutter or noise signals. The $S_{11}$ signal was obtained using the time gating function on the vector network analyzer (VNA) because the reflection due to the horn captured a major component to the $S_{11}$ signal, and thus time gating to measure the received signal around the time of interest allowed accurate measurement of the reflection, and isolation of the metasurface from reflections due to other sources.

FIG. 11A is a schematic diagram 1100 of a monostatic RCS measurement apparatus, according to some embodiments. Horn 1102 is a fixed transmission and receiving horn that emits an incident EM wave, and receives a reflected EM wave, along a wave path 1104. The incident wave impacts a metasurface 1106 with an effective area comparable to a copper plate 1108 having a different size than the metasurface 1106 that reflects the incident wave. Metasurface 1106 is rotated by a rotation angle ($\theta_{rot}$) 1110 to perform the monostatic RCS measurement. At each rotation angle 1110 of the metasurface 1106, the intensity of reflected EM wave is measured at the horn 1102 and compared to the intensity of the reflected EM wave that would be reflected from a copper plate having an effective area at the same rotation angle 1110. When the actual reflected EM wave strength measured at horn 1102 is comparable to the model EM wave, the metasurface reflection is strongly efficient.

FIG. 11B is a schematic diagram 1120 of a bistatic RCS measurement apparatus, according to some embodiments. Horn 1124 emits an incident EM wave onto a metasurface 1122 in a reflection plane 1121, with an incident angle ($\theta_{incident}$) 1128. After striking metasurface 1122, the incident EM wave becomes a reflected EM wave and is detected at a movable receiving horn 1126. A variable angle ($\theta_{variable}$) 1130 between the incident EM wave and the reflected EM wave is recorded for each incident angle 1128 in order to measure reflection efficiency of the incident EM wave from the metasurface 1122. According to some embodiments, there are limitations on the variable angle measured in a bistatic RCS setup because the movable receiving horn 1126 is only accurate to within ±4° from the fixed horn.

Figure 12:
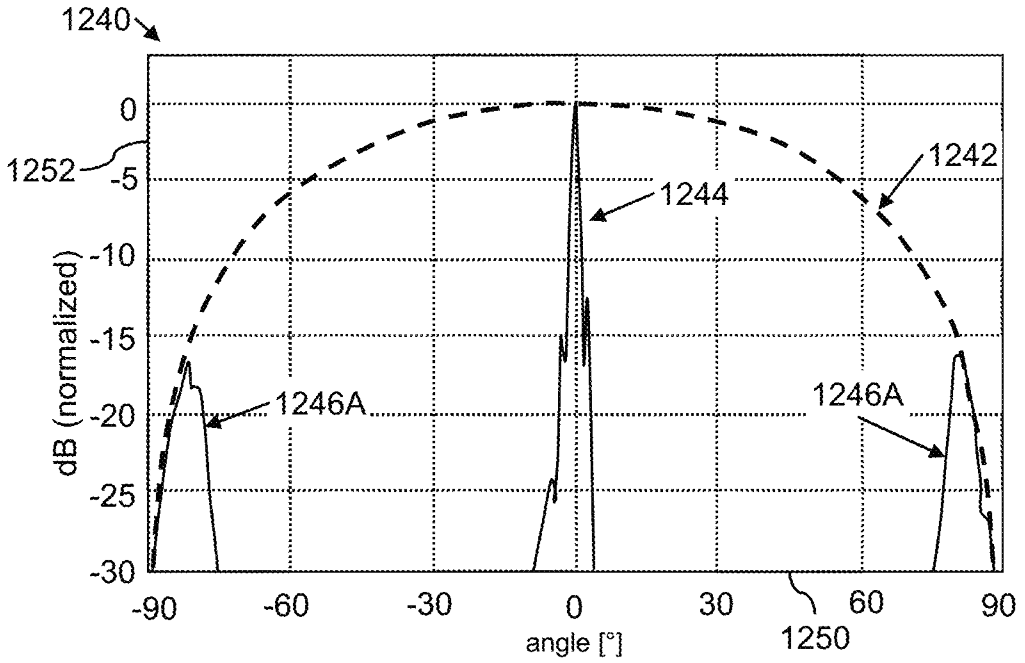
FIG. 12 is a comparison chart of an RCS measurement, in accordance with some embodiments.

FIG. 12 is a comparison plot 1240 of a monostatic RCS measurement of a copper plate (lobes 1244 and 1246A-B) and the effective aperture 1242 of the metasurface, according to some embodiments. The angle on x-axis 1250 is the angle of the wave path 1104 with respect to the metasurface 1106. The intensity on the y-axis 1252 is measured at the horn 1102. In FIG. 12, retroreflection nodes where at ±81° the retroreflected power is only 0.1 dB smaller than the effective copper plate, which corresponds to 98% aperture efficiency. Therefore, when considering the effective aperture, it is seen that most of the power is coupled into an angle very close to retroreflection.

Figure 13:
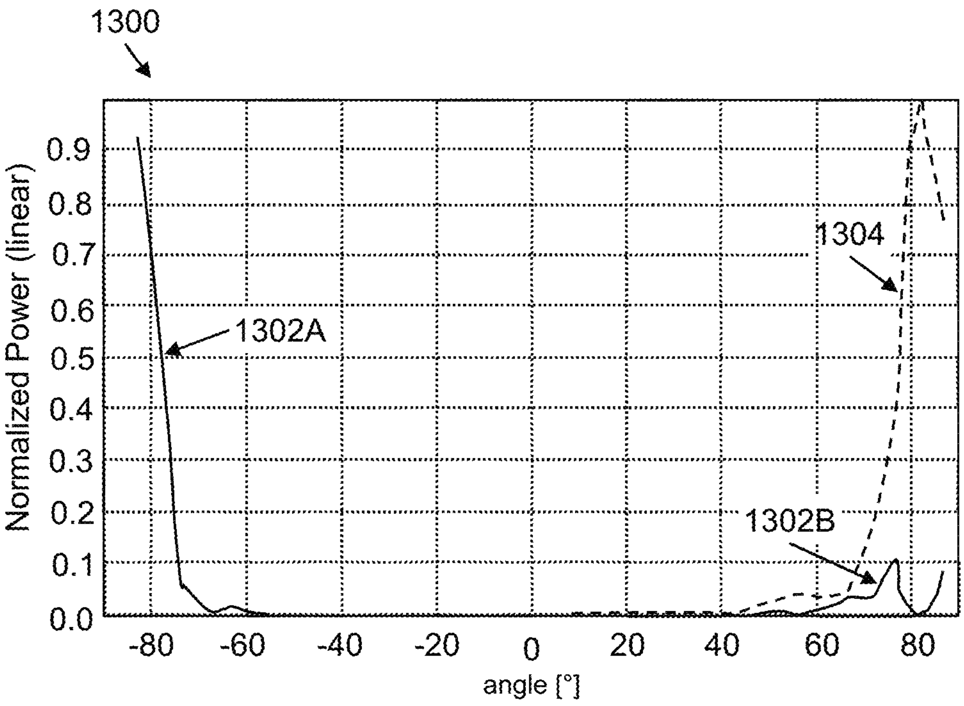
FIG. 13 is a diagram of a bistatic RCS measurement of a TE-reflective metasurface, in accordance with some embodiments.

FIG. 13 is a comparison chart 1300 of a TE-reflective metasurface bistatic RCS measurement 1302A-B and a copper plate bistatic RCS measurement 1304, according to some embodiments. Bistatic RCS measurements were performed with an experimental setup depicted in FIG. 11B. The metasurface and/or copper plate was placed on a platform between two arms as shown in FIG. 11B. A $S_{21}$ signal is the reflected scattering parameter for a bistatic RCS measurement antenna. In some incident angles (−82.87° in the present example, although other incident angles are envisioned) the signal echoed by the metasurface is retroreflected. EM waves that strike a metasurface at an angle other than the incident angle for which the metasurface controllably reflects, the reflection is specular, or scattering. The $S_{21}$ signal received from the receiving horn was measured using a vector network analyzer (VNA) after performing two operations. In a first operation, the $S_{21}$ background level was recorded into memory (without the metasurface on the platform), and in a second operation, the metasurface was positioned in front of the incident wave and the $S_{21}$ was measured again, with the subtraction of the background.

In the present example, the TE-reflective metasurface and the copper plate used to generate comparison chart have the same surface area. The retroflection from a TE-reflective metasurface at −82.87° corresponds to 93% of the power that specularly reflects off a copper plate of the same size, while the specular reflection of the TE-reflective metasurface is greatly reduced to only 10% when compared to a copper plate. Stronger suppression at the specular angle is evidenced by the dip at +82.87°. However, the finite size of the metasurface and the angular width of the incident beam created appreciable reflection at an angle near the specular angle, for which the suppression is less dramatic. We can obtain greater efficiency and retroreflection at the designed angle of −82.87° by increasing the size of the board.

TM-Reflective Metasurface Reflection Measurement

A TM-reflective metasurface was fabricated with a configuration similar to the TE-reflective metasurface 136 cells in the y-direction (the same number of cells that were used for the 1D finite simulation) and 87 cells in the x-direction, with a (428 mm×275 mm). We measured the monostatic and bistatic RCS of this metasurface in a similar manner to its TE counterpart.

Figure 14:
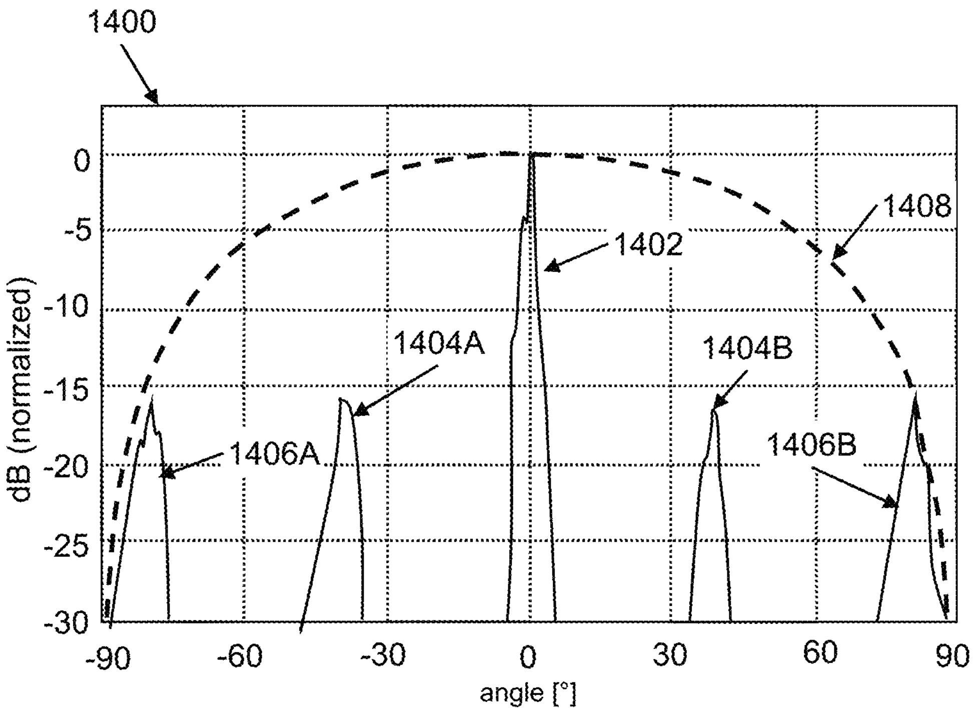
FIG. 14 is a diagram of a monostatic RCS measurement for a TM-reflective metasurface, in accordance with some embodiments.

FIG. 14 is a diagram 1400 of a monostatic RCS measurement of an effective copper plate 1408 at ±82.87° and a TM-reflective metasurface (see nodes 1402, 1404A-B, and 1406A-B) according to some embodiments. Node 1402 is associated with specular reflection from the metasurface, nodes 1404A-B are associated with spurious reflection from the metasurface, and nodes 1406A-B are associated with retroreflection from the metasurface. Comparison of the monostatic TM-reflective metasurface reflection and an effective copper plate at ±82.87°, there is a difference of 0.2 dB, which is an aperture efficiency of 95%. Thus, the majority of the power is coupled into the retroreflected mode. FIG. 14 is also consistent with simulation results, where the retroreflected power at ±82.87° and ±37° is in the range of −18 dB to −15 dB.

Figure 15:
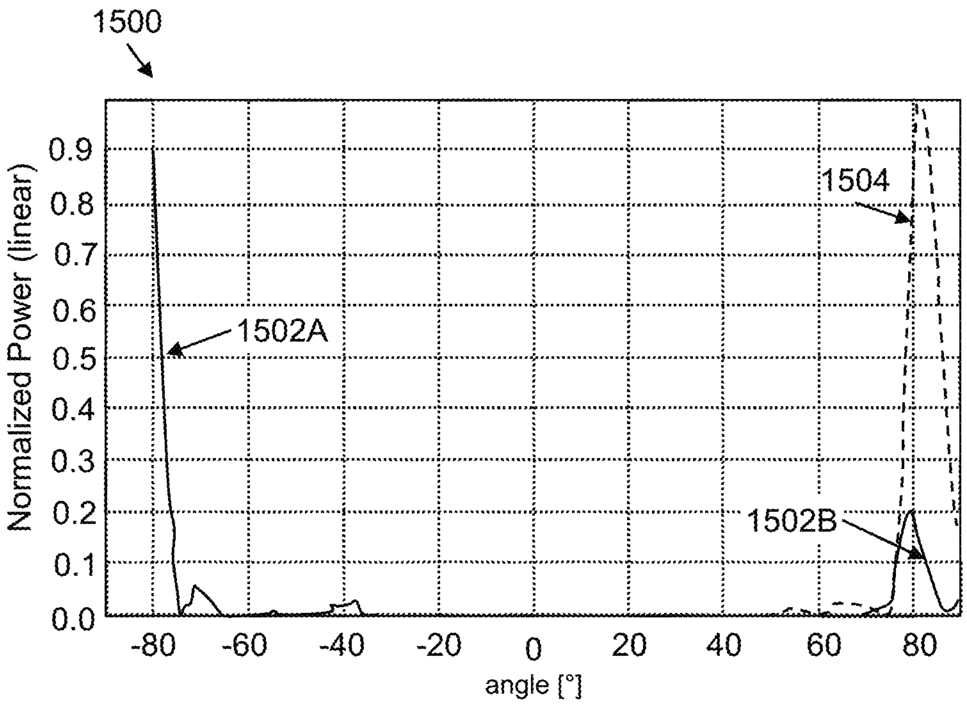
FIG. 15 is a diagram of a bistatic RCS measurement for a TM-reflective metasurface, in accordance with some embodiments.

FIG. 15 is a diagram 1500 of a bistatic RCS measurement of an effective copper plate 1504 and a TM-reflective metasurface 1502A-B, according to some embodiments. Bistatic RCS experiments presented in FIG. 15 are performed at an incident angle of −81° rather than −82.87° to compensate for the effects of a finite metasurface. Node 1502A is the RCS node associated with strong retroreflection, and node 1502B is the RCS node associated with suppressed specular reflection. Node 1502A, with an incident angle of −81°, is approximately 93% of the power that specularly reflects off a copper plate.

We have reported binary Huygens' metasurfaces which achieve strong retroreflection at near-grazing incidence for both TE and TM polarizations. These binary Huygens' metasurfaces feature aggressive discretization's of only two elements per grating period, implemented by ground-backed dipole (for the TE surface) and slot (for the TM surface) arrays. We have reported their design procedure, and through simulations and experiments we have demonstrated their capability to achieve strong retroreflection and greatly suppress specular reflection. Experimental demonstration shows the achievement of retroreflection at 90-95% aperture efficiency for both polarizations. In departure from contemporary metasurfaces, the binary Huygens' metasurfaces introduced here boast single layer construction, large unit-cell sizes and simple elements, which lead to advantages in relaxed precision tolerance, simple fabrication and robust operation. These advantages make the binary Huygens' metasurface an attractive candidate for the design of next-generation cost-efficient, low-profile and effective retroreflectors for mm-wave and THz frequencies.

Aspects of the present disclosure relate to a metasurface which includes a dielectric material; a ground plane on a back side of the dielectric material; and at least one conductive element on a top surface of the dielectric material, wherein the at least one conductive element includes at least one of a ground-backed dipole or a slot array. According to some embodiments, the dielectric material comprises an insulator material for a printed circuit board. According to some embodiments, the at least one conductive element further comprises a metal for a printed circuit board. According to some embodiments, the metasurface is configured to have strong retroreflection of both a TM and a TE electromagnetic (EM) wave at an incident angle greater than or equal to 0° and less than 90°. According to some embodiments, a reflection efficiency of an incident electromagnetic (EM) wave is less than 5% in a specular direction and greater than 95% in a retro direction. According to some embodiments, the reflection efficiency of the TM polarized portion of the incident EM wave and the TE polarized portion of the incident EM wave is greater than 92% in a retro direction. According to some embodiments, the metasurface is discretized to have not more than two elements per grating period of the metasurface. According to some embodiments, a first element of each grating period is a ground-backed dipole, and a second element of each grating period is a slot. According to some embodiments, the metasurface is configured to reflect an incident electromagnetic (EM) wave at a reflected angle that is not equal to a specular reflection angle of the incident EM wave. According to some embodiments, the metasurface is configured to retroreflect the incident electromagnetic (EM) wave.

Aspects of the present disclosure relate to a method of designing a metasurface to reflect an electromagnetic (EM) wave, where the method includes selecting, for the metasurface, an incident angle of an incident electromagnetic (EM) wave to be reflected; selecting, for the metasurface, a reflection angle of a reflected electromagnetic (EM) wave; and forming at least one reflective element on the metasurface, the metasurface further comprising a conductive element separated from a ground plane by an insulating substrate. According to some embodiments, the at least one reflective element further comprises a ground-backed dipole or a slot array. According to some embodiments, the incident angle is different from the reflection angle. According to some embodiments, the reflection angle is a negative of the incident angle. According to some embodiments, a first reflective element of the at least one reflective element is configured to reflect only a TE-polarized portion of an incident EM wave. According to some embodiments, a first reflective element of the at least one reflective element is configured to reflect only a TM-polarized portion of an incident EM wave.

Aspects of the present disclosure relate to a metasurface that includes an insulating substrate; a ground plane against a first surface of the insulating substrate; and conducting elements on a second surface of the insulating substrate, wherein a first set of conducting elements in a first area is configured to reflect a first incident electromagnetic (EM) wave having a first incident angle at a first reflection angle, and a second set of conductive elements in a second area is configured to reflect a second incident EM wave having a second incident angle at a second reflection angle. According to some embodiments, the first incident EM wave is the same as the second incident EM wave, and the first reflection angle is different than the second reflection angle. According to some embodiments, the first incident EM wave is different from the second incident EM wave, and the first reflection angle is the same as the second reflection angle. According to some embodiments, the first incident EM wave is different from the second incident EM wave and the first reflection angle is different from the second reflection angle. The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of designing a metasurface to reflect a transverse electric (TE) wave, the method comprising:

selecting, for the metasurface, an incident angle of an incident TE wave to be reflected;

selecting, for the metasurface, a reflection angle of a reflected TE wave;

forming an insulating substrate;

forming a ground plane on a bottom of the insulating substrate; and forming a conductive element on a top surface of the insulating substrate, the conductive element including at least one reflective element, wherein:

a first reflective element of the at least one reflective element is configured to reflect only a TM-polarized portion of an incident EM wave; and a second reflective element of the at least one reflective element is configured to reflect only a TE-polarized portion of the incident EM wave.

2. The method of claim 1, wherein the reflective element further comprises a ground-backed dipole or a slot array.

3. The method of claim 1, wherein the incident angle of the EM wave is different from the reflection angle.

4. The method of claim 1, wherein the reflection angle of the EM wave is a negative of the incident angle.

5. A metasurface, comprising:

an insulating substrate;

a ground plane formed on a bottom surface of the insulating substrate; and conducting elements formed on a top surface of the insulating substrate, wherein a first set of the conducting elements in a first area is configured to reflect only a TM-polarized portion of a first incident electromagnetic (EM) wave having a first incident angle at a first reflection angle; and a second set of the conductive elements in a second area is configured to reflect only a TE-polarized portion of a second incident EM wave having a second incident angle at a second reflection angle;

wherein at least one of the first set of the conducting elements or the second set of the conductive elements includes a ground-backed dipole or a slot array.

6. The metasurface of claim 5, wherein the first incident EM wave is the same as the second incident EM wave, and the first reflection angle is different than the second reflection angle.

7. The metasurface of claim 5, wherein the first incident EM wave is different from the second incident EM wave, and the first reflection angle is the same as the second reflection angle.

8. The metasurface of claim 5, wherein the first incident EM wave is different from the second incident EM wave and the first reflection angle is different from the second reflection angle.

9. A method of manufacturing a metasurface to reflect a transverse electric (TE) wave, the method comprising:

selecting an incident angle of an incident TE wave to be reflected;

selecting for the metasurface, a reflection angle of a reflected TE wave;

determining a metasurface reflective element configuration that will achieve the reflection angle;

combining a plurality of metasurface reflective elements having the metasurface reflective element configuration into a metasurface unit cell, wherein the plurality of metasurface reflective elements include:

an insulating substrate;

a conductive layer formed on a top primary surface of an insulating substrate wherein the conductive layer includes a first conductive element in the metasurface unit cell on a first portion of top primary surface of the insulating substrate, and the conductive layer includes a second conductive element in the metasurface unit cell on a second portion of the top primary surface of the insulating substrate; and a ground plane formed on a bottom primary surface of the insulating substrate;

wherein:

the first conductive element is a ground-backed dipole;

the first conductive element is configured to produce a retroreflection of a transverse electric (TE) electromagnetic (EM) wave at the incident angle greater than or equal to 0° and less than 90°;

the first and second portions of the top primary surface of the insulating substrate are separate; and the second conductive element is a slot array, wherein the second conductive element is configured to produce a retroreflection of a transverse magnetic (TM) EM wave at the incident angle.

10. The method of manufacturing the metasurface according to claim 9, wherein the ground-backed dipole has a first rectangular perimeter that lies entirely within the first portion of the top primary surface of the insulating substrate; and the slot array has a second rectangular perimeter that lies entirely within the second portion of the top primary surface of the insulating substrate, wherein the first rectangular perimeter is different than the second rectangular perimeter.

11. The method of manufacturing the metasurface according to claim 9, wherein the first conductive element is electrically isolated from the second conductive element.

12. The method of manufacturing the metasurface according to claim 9, wherein the first conductive element has a first length $P_{x1}$ along a first axis;

the second conductive element has a second length $P_{x2}$ parallel to the first axis, wherein the first and second lengths satisfy expression $P_{x1}<P_{x2}$.

13. The method of manufacturing the metasurface according to claim 9, wherein a reflection efficiency of an incident electromagnetic (EM) wave is less than 5% in a specular direction and greater than 95% in a retro direction.

14. The method of manufacturing the metasurface according to claim 9, wherein the slot array achieves a reflection efficiency of a TM-polarized portion of the EM wave of more than 92% in a retro direction; and the ground-backed dipole achieves a reflection efficiency of a TE-polarized portion of the EM wave of more than 92% in the retro direction.

15. The method of manufacturing the metasurface according to claim 9, further comprising discretizing the metasurface as a plurality of grating periods, wherein each grating period consists essentially of the first conductive element and the second conductive element.

16. The method of manufacturing the metasurface according to claim 9, wherein the metasurface is configured to reflect an incident electromagnetic (EM) wave at a reflected angle that is not equal to a specular reflection angle of the incident EM wave.

17. The method of manufacturing the metasurface according to claim 9, wherein the insulating substrate comprises an insulator material for a printed circuit board, and the plurality of metasurface reflective elements comprise a metal for the printed circuit board.

18. A method of manufacturing a metasurface, the method comprising:

forming a metasurface, wherein the forming the metasurface includes:

forming a ground plane;

forming an insulating layer on a top surface of the ground plane; and forming a conductive element on a top surface of the insulating substrate;

wherein the conductive element includes a first reflective element configured to reflect only a TE-polarized portion of an incident EM wave; and wherein the conductive element includes a second reflective element configured to reflect only a TM-polarized portion of the incident EM wave; and wherein the at least one of the first or second reflective element further includes a ground-backed dipole or a slot array.

* * * * *